(12) United States Patent
Katayama

(10) Patent No.: US 7,753,305 B2
(45) Date of Patent: Jul. 13, 2010

(54) SEAT BELT RETRACTOR

(75) Inventor: Takao Katayama, Suita (JP)

(73) Assignee: Ashimori Industry Co., Ltd., Osaka (JP)

( * ) Notice: Subject to any disclaimer, the term of this patent is extended or adjusted under 35 U.S.C. 154(b) by 866 days.

(21) Appl. No.: 10/543,894

(22) PCT Filed: Jan. 29, 2004

(86) PCT No.: PCT/JP2004/000796

§ 371 (c)(1),
(2), (4) Date: May 8, 2006

(87) PCT Pub. No.: WO2004/067339

PCT Pub. Date: Aug. 12, 2004

(65) Prior Publication Data

US 2006/0219832 A1 Oct. 5, 2006

(30) Foreign Application Priority Data

Jan. 31, 2003 (JP) ............................... 2003-024786

(51) Int. Cl.
*B60R 22/28* (2006.01)
*B60R 22/405* (2006.01)

(52) U.S. Cl. ..................... 242/379.1; 242/383; 242/384

(58) Field of Classification Search ................. 242/374, 242/379.1; 280/805, 807; 297/471, 472, 297/475–478

See application file for complete search history.

(56) References Cited

U.S. PATENT DOCUMENTS

| 3,666,198 | A |   | 5/1972  | Neuman      |         |
|-----------|---|---|---------|-------------|---------|
| 4,323,205 | A | * | 4/1982  | Tsuge et al.| 242/379.1 |
| 5,607,118 | A |   | 3/1997  | Dybro et al.|         |
| 5,823,570 | A |   | 10/1998 | Lane et al. |         |
| 5,961,060 | A |   | 10/1999 | Brambilla et al. |    |
| 5,967,442 | A |   | 10/1999 | Wier        |         |
| 6,216,972 | B1| * | 4/2001  | Rohrle      | 242/379.1 |
| 6,241,172 | B1|   | 6/2001  | Fugel et al.|         |
| 6,416,006 | B1| * | 7/2002  | Huber       | 242/379.1 |
| 6,564,895 | B1|   | 5/2003  | Bohmler     |         |
| 6,598,822 | B2| * | 7/2003  | Nagata et al.| 242/379.1 |
| 6,616,081 | B1|   | 9/2003  | Clute et al.|         |

(Continued)

FOREIGN PATENT DOCUMENTS

DE 202 10 812 U1 11/2002

(Continued)

*Primary Examiner*—John Q Nguyen
*Assistant Examiner*—Scott Haugland
(74) *Attorney, Agent, or Firm*—Sughrue Mion, PLLC

(57) ABSTRACT

In a seatbelt retractor of this invention is provided with an energy-absorbing means which performs an energy absorption by twisting a rotational shaft of a spool (first energy-absorbing means) and an energy-absorbing means which performs an energy absorption by twisting a wire 2b (second energy-absorbing means), a containing side (upper side of the disk member 2c) which contains the wire 2b and a take-up side (side between the disk member 2c and a plate body 2a) which takes up the wire after being pulled out from the containing side and being twisted are made on different planes, so that the length of the wire which constitutes the second energy-absorbing means can be made longer, and the energy-absorbing time by both the torsion bar and the wire can be extended.

15 Claims, 21 Drawing Sheets

U.S. PATENT DOCUMENTS

| | | | |
|---|---|---|---|
| 6,969,022 B2 * | 11/2005 | Bell et al. | 242/379.1 |
| 2002/0017583 A1 | 2/2002 | Yano et al. | |
| 2003/0192975 A1 * | 10/2003 | Palliser et al. | 242/379.1 |
| 2003/0192976 A1 * | 10/2003 | Palliser et al. | 242/379.1 |

FOREIGN PATENT DOCUMENTS

| | | |
|---|---|---|
| JP | 9-202211 A | 8/1997 |
| JP | 9286302 A | 11/1997 |
| JP | 10-100860 A | 4/1998 |
| JP | 2001-55115 A | 2/2001 |
| JP | 2001206193 A | 7/2001 |
| JP | 2001287621 A | 10/2001 |
| JP | 2001301569 A | 10/2001 |
| JP | 2002-53007 A | 2/2002 |
| WO | 0076814 A1 | 12/2000 |

* cited by examiner

1. High energy-absorbing load : O, A, B, D, F
2. Low energy-absorbing load : O, A, C, E
3. Middle energy-absorbing load : O, A, B, D, C, E

SEAT BELT RETRACTOR

TECHNICAL FIELD

The present invention relates to a seatbelt retractor provided with an energy-absorbing means, which, in case of a vehicle emergency, restrains a webbing from being pulled out to restrain movements of vehicle occupant and absorbs an impact load acting on the vehicle occupant.

BACKGROUND TECHNOLOGY

There has been known conventionally in the seatbelt retractor that has enhanced an energy-absorbing capability without sacrificing the compactification.

As an example, there has been known a seatbelt apparatus provided with an energy-absorbing means, which has a wire engaged with a locking base and a bobbin (take-up drum) having a webbing wound thereon, and pulls the wire during a relative rotation between the locking base and the bobbin to thereby absorb the energy (JP 2002-53007A).

In the conventional seatbelt apparatus, the wire is engaged so as to meander along an engagement pin, one end of which is attached to the locking base.

Here in this case, since a part of the wire before being pulled by the engagement pin and a part of the wire after being pulled are set to be flush with a boss having the wire wound thereon, it is impossible to set the length of the wire sufficiently long, and accordingly impossible to extend the energy-absorbing time (EA). Since the engagement pin is attached to be flush with the boss, the spacing is narrow, and it is impossible to wind up the wire plural times in lamination.

Therefore, an object of the present invention is to solve the above conventional problems.

That is, the object is to increase the length of a deformable member (wire) by winding it up plural times in spiral, which makes it possible to extend the energy-absorbing time (EA) by both the members of a take-up shaft or a torsion bar and the deformable member, also makes it possible to expand the spacing in a take-up part of a plate body, and also makes it possible to wind up the deformable member (wire) plural times on an upper part in the circumferential direction of the take-up part.

DISCLOSURE OF THE INVENTION

1. A seatbelt retractor according to a first aspect of the invention comprises a take-up drum on which a webbing is wound, a torsion bar inserted through the take-up drum, one end of which is coupled with one end of the take-up drum in a manner that a relative rotation with the take-up drum is impossible, which is biased in the direction of the webbing taken up, an emergency lock mechanism located on the other end of the torsion bar, which restrains a rotation in the direction of the webbing pulled out, a lock actuating device which actuates the emergency lock mechanism in case of a vehicle emergency, a plate body having a take-up part on a side thereof being adjacent to a side on the other end of the take-up drum, which is coupled with the other end of the torsion bar in a manner that a relative rotation with the torsion bar is impossible, a deformable member, one end of which is coupled with the take-up part of the plate body, a part continued to the one end of which is located in a deformable member guide part formed on a periphery on the other end of the take-up drum, a part continued to the deformable member guide part which is wound up on and contained in a side different from a take-up side of the take-up part, which is wound up on the take-up part of the plate body by the take-up drum in case of a vehicle emergency, and a curved path on which a substantially medium part of the deformable member is located, which is formed on the periphery on the other end of the take-up drum.

According to the first aspect of the invention, since the deformable member (wire) is positioned on an upper part in the circumferential direction of the take-up part, the components of the seatbelt retractor do not move after a vehicle emergency, and the positional relation of the components is held to be constant, and hence the components can be designed with simple structures. Since the side in the circumferential direction which contains the deformable member (wire) before deformation (the side on the other end) is different from the side on which the take-up part of the plate body is located, the deformable member (wire) can be provided longer, and the energy-absorbing time by both members of the torsion bar and the deformable member (wire) can be extended. Further, since the curved path is formed on the periphery of the take-up drum, a gap in the take-up part of the plate body can be made wider, and the deformable member (wire) can be wound up several times on the upper part in the circumferential direction of the take-up part.

2. A seatbelt retractor according to a second aspect of the invention is that, in the seatbelt retractor according to the first aspect of the invention, the deformable member is a wire, and the deformable member guide part is formed on the curved path.

Thereby, the wire slides on the curved path formed on the periphery on the other end of the take-up drum, and it is continually positioned on the upper part in the circumferential direction of the take-up part by the deformable member guide part, thus, a stabilized energy absorption by the wire can be attained.

3. A seatbelt retractor according to a third aspect of the invention is that the seatbelt retractor according to the second aspect of the invention further comprises a disk member located between the take-up drum and the plate body, which is coupled with the plate body with a distance of the diameter of the wire from the plate body in a manner that a relative rotation with the plate body is impossible, and the disk member covers the take-up part of the plate body and the other end of the wire.

Thereby, the wire wound up on the plate body is piled up regularly on one plane of the take-up-part by the disk member without interference from the wire before deformation, thus, a stabilized energy absorption can be attained. Further, the wire before deformation is supplied regularly to the curved path of the take-up drum by the side on the other end of the take-up drum and the disk member, thus, a stabilized energy absorption can be attained.

4. A seatbelt retractor according to a fourth aspect of the invention is that, in the seatbelt retractor according to the third aspect of the invention, the wire attached to the take-up part of the plate body is located in a curved groove formed by plural projections, and the curvature radius of the curved groove is smaller than that of the curved path of the take-up drum.

Thereby, the wire can be pulled out from the curved path of the take-up drum by merely the difference of the curvature radius, and the wire can be fixed easily without using another member for fixing.

5. A seatbelt retractor according to a fifth aspect of the invention is that, in the seatbelt retractor according to the third aspect of the invention, at least one set of ribs facing to each other are provided between the plural projections forming the curved groove in the plural projections of the plate body, and a gap between the ribs is narrower than the diameter of the wire.

Thereby, the wire placed in the curved groove on the side of the plate body becomes difficult to come off in the vertical direction (in the axial direction of the torsion bar) from the side thereof, and the wire can be fixed more firmly, which stabilizes the initial setting in attaching. And, after attaching, carrying and assembling operations can be made easily.

6. A seatbelt retractor according to a sixth aspect of the invention is that, in the seatbelt retractor according to any one of the first through fifth aspects of the invention, a clutch mechanism is provided between the other end of the torsion bar and the plate body.

Thereby, a load in the energy absorption can be reduced at an arbitrary level, and the energy absorption can be actuated under an optimum condition in correspondence with parameters such as physical make-up of vehicle occupant and scale of a vehicle collision.

BEST MODE FOR CARRYING OUT THE INVENTION

The preferred embodiment of the seatbelt retractor according to the present invention will be described in detail with reference to the accompanying drawings.

Figure 1:
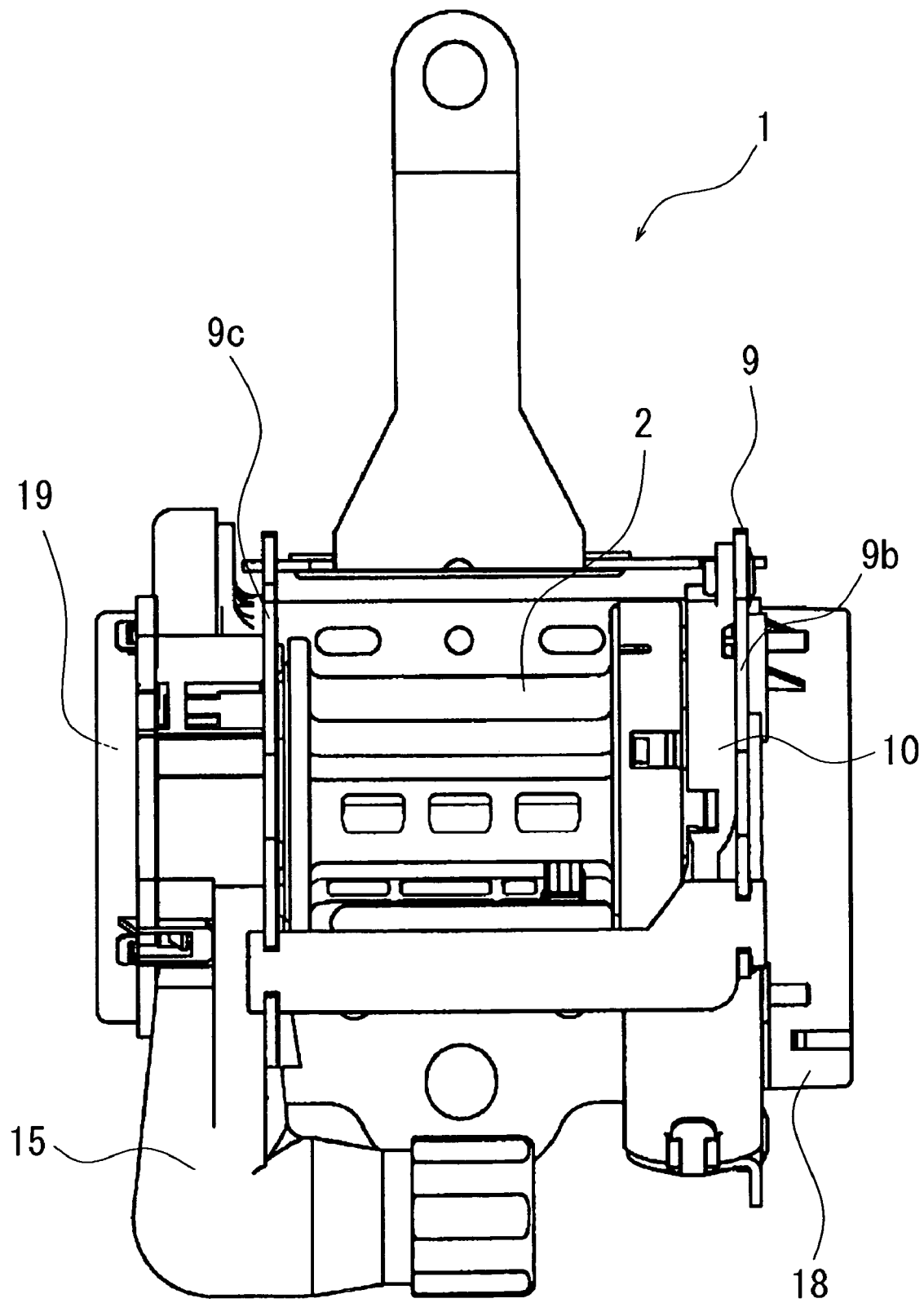
FIG. 1 is a front view of the whole seatbelt retractor according to the present invention.
Figure 2:
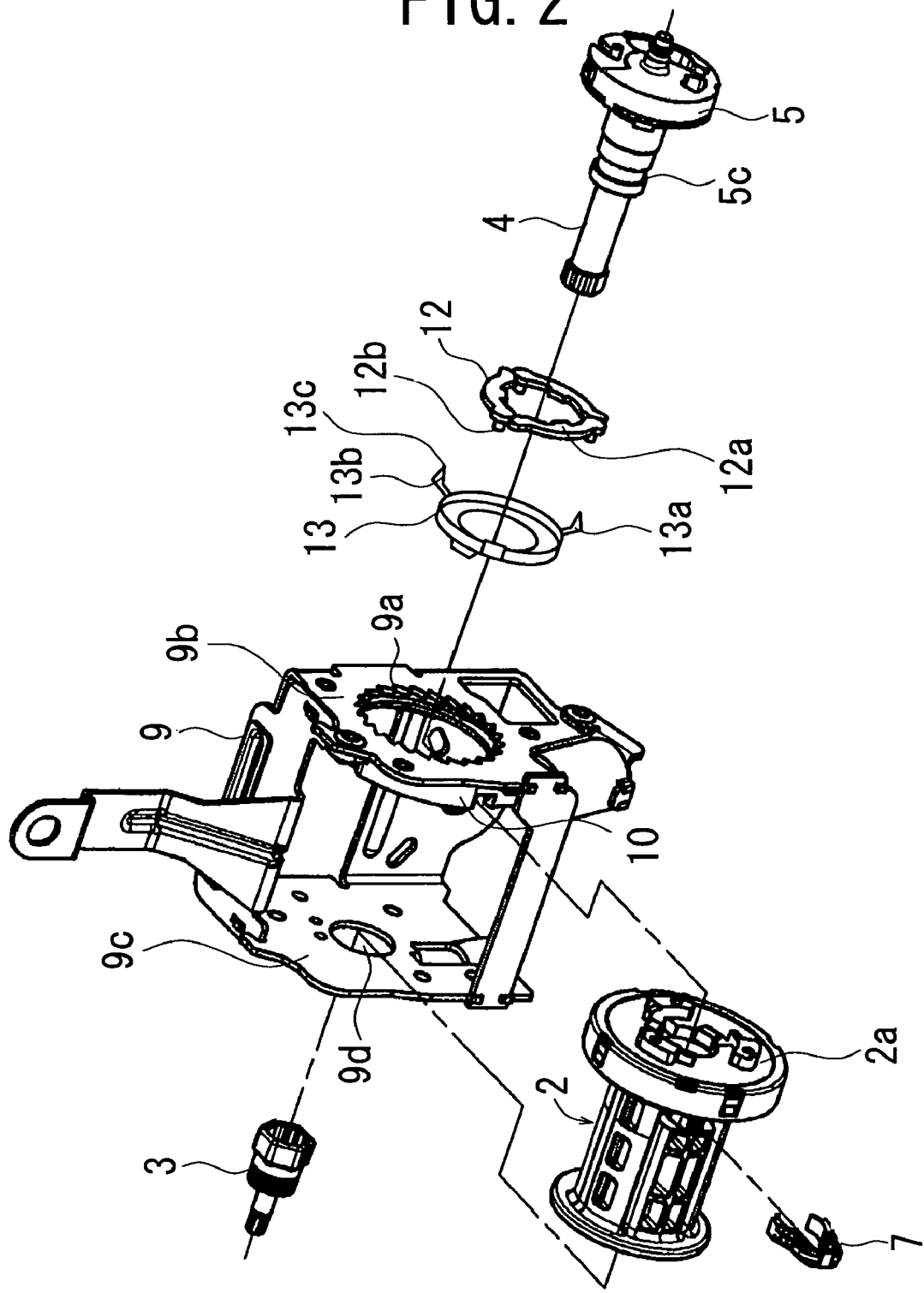
FIG. 2 is an exploded perspective view explaining the assembling of a housing, a take-up drum, a torsion bar, a locking base, a base stopper, and so forth of the seatbelt retractor illustrated in FIG. 1.

FIG. 1 is a front view of the whole seatbelt retractor according to the invention, and FIG. 2 is an exploded perspective view explaining the assembling of a take-up drum 2, a connector 3, a housing 9, a torsion bar 4, a locking base 5, a base stopper 7, and so forth which constitute the major part of the seatbelt retractor illustrated in FIG. 1.

In FIG. 2, the seatbelt retractor is provided with the substantially cylindrical take-up drum 2 on which webbing is wound. The torsion bar 4 is inserted through the center of the take-up drum 2, and one end of the torsion bar 4 is coupled integrally with one end of the take-up drum 2 by means of the connector 3, and it is supported by a pair of side plates (9b, 9c) to freely rotate. A spiral spring 19 (FIG. 1) is mounted on the side plate 9c, which constantly biases the take-up drum 2 to rotate in the take-up direction of the webbing, and the torsion bar 4 is biased to rotate in the take-up direction of the webbing.

Here, the seatbelt retractor in this embodiment has the structure which winds up slackness in the webbing by a gas pressure, and so forth in case of a vehicle emergency such as a collision, and restrains the movements of vehicle occupant by a pretensioner 15 (FIG. 1) furnished on the side plate 9c.

The locking base 5 resembling a substantially disk-like shape is coupled integrally with the other end outside of the torsion bar 4 on the side of the side plate 9b of the housing, and it constitutes an emergency lock mechanism which restrains a rotation in the direction of the webbing pulled out.

A clutch mechanism, described later, is located near the other end of the torsion bar 4. A second energy-absorbing means, described later, is located on the other end of the torsion bar 4, close to the side on the other end of the take-up drum 2, wherein the torsion bar 4 (first energy-absorbing means) and the second energy-absorbing means perform the absorption of impact energy in case of a vehicle emergency.

The housing 9 is made from a metal plate by a press-molding in a manner the right and left side plates (9b, 9c) rise up from both the sides of a back-plate fixed to the vehicle body, and the section of the housing forms a substantially U-letter. The left side plate 9c has an opening 9d formed, and the right side plate 9b has lock teeth 9a formed, while the torsion bar 4 assembled with the take-up drum 2 is bridged to freely rotate between the right and left side plates (9b, 9c), and the take-up drum 2 is continuously biased in the take-up direction of the webbing.

The base stopper 7 is to prevent the locking base 5 from coming off from the take-up drum 2.

First Energy-absorbing Means

Next, the first energy-absorbing means will be described.

As shown in FIG. 2, the one end of the torsion bar 4 is engaged with a hole of the connector 3 having the same shape thereof, and the other end is coupled with the locking base 5 to be able to rotate integrally.

The connector 3 is supported to freely rotate with the opening 9d bored on the side plate 9c of the housing 9, and it is also engaged with a hexagonal engagement recess being formed on the one end of the take-up drum 2 to correspond with the external shape of the connector 3, whereby the torsion bar 4 is capable of rotating integrally with the take-up drum 2.

Therefore, even if the emergency lock mechanism actuates the operation and the other end of the torsion bar 4 is fixed, the one end of the torsion bar 4 will rotate integrally with the take-up drum 2 by the webbing being pulled out. That is, the torsion bar 4 is twisted by the rotational force of the take-up drum 2, thus the energy of pulling out the webbing can be absorbed by the torsion resistance thereof.

In this manner, the torsion bar 4 functions as the first energy-absorbing means.

Second Energy-absorbing Means

Next, the second energy-absorbing means will be described with reference to FIG. 3 through FIG. 7.

Figure 3:
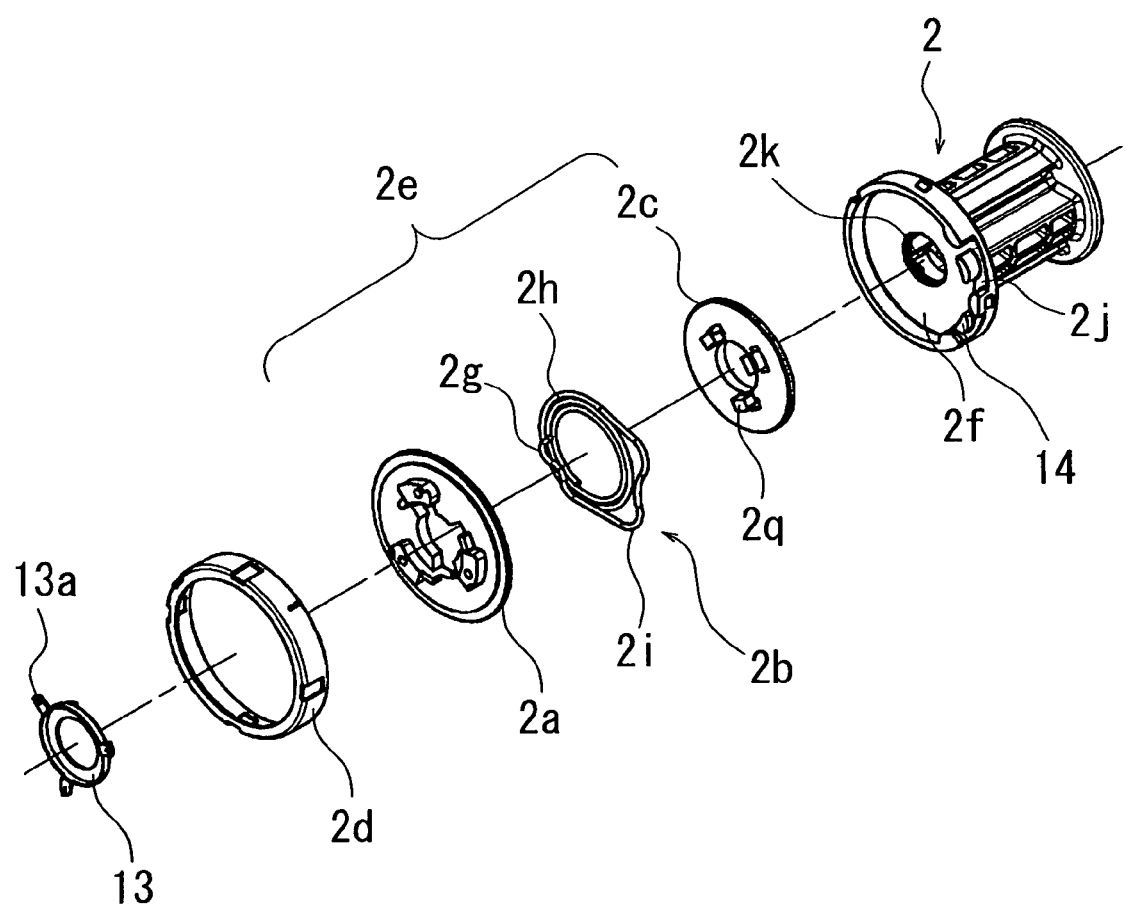
FIG. 3 is an exploded perspective view explaining the assembling of a plate assembly.

FIG. 3 is an exploded perspective view explaining the assembling of a plate assembly 2e, which constitutes the second energy-absorbing means. The plate assembly 2e comprises a plate body 2a, a spiral wire 2b with plural winds, and a disk member 2c having plural projections 2q located circumferentially around a center hole.

In FIG. 3, one end 2g of the wire is fixed to the plate body 2a, and the other end 2h of the wire is suspended to the backside of the disk member 2c (viewed from FIG. 3).

Figure 4:
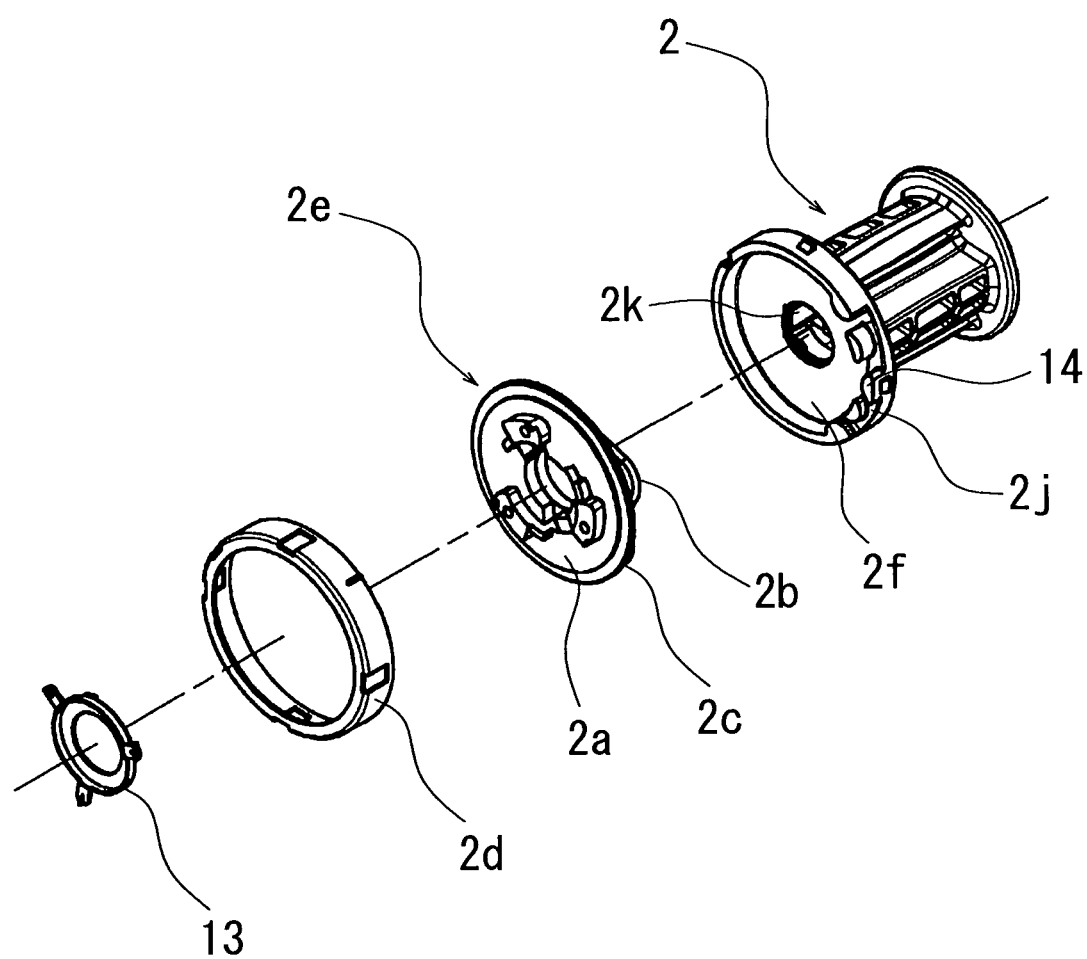
FIG. 4 is an exploded perspective view explaining the assembling of the plate assembly, a retainer, the take-up drum, and so forth.

FIG. 4 is an exploded perspective view illustrating the whole of the second energy-absorbing means. The plate assembly 2e and the take-up drum 2 are attached with a retainer 2d.

Figure 5:
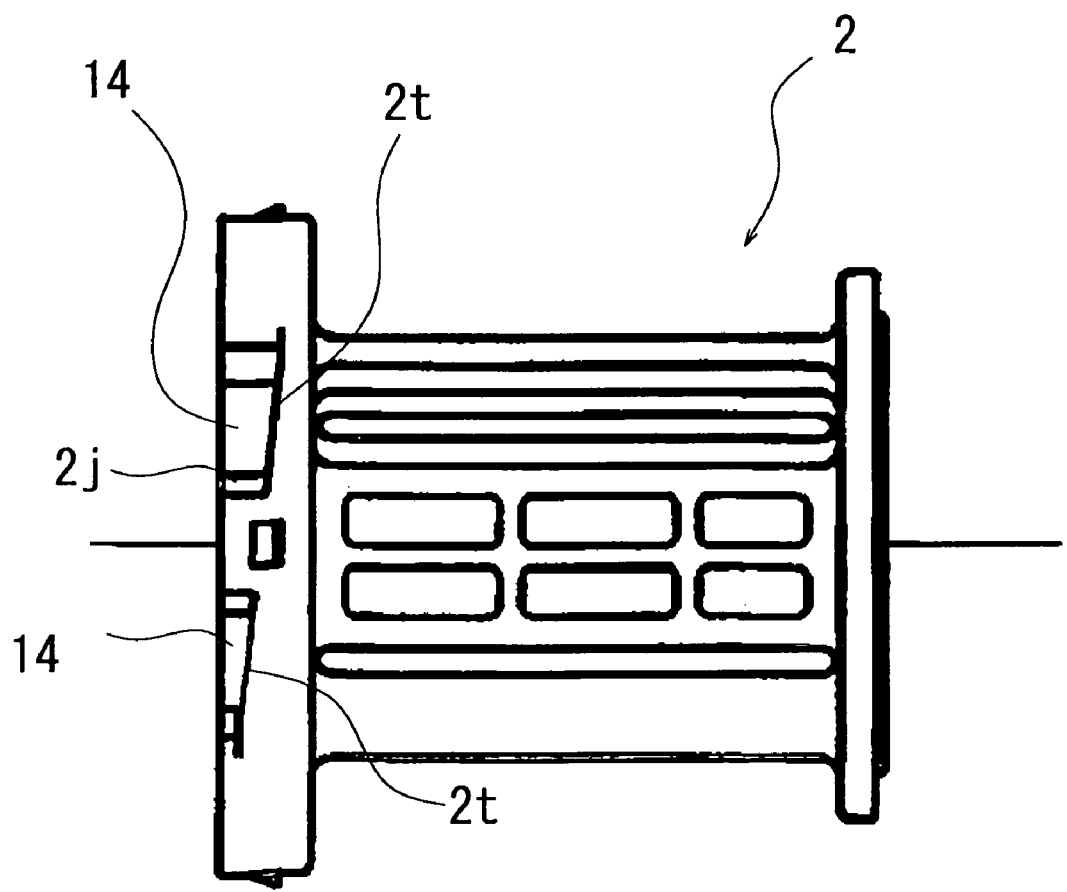
FIG. 5 is a front view of the take-up drum.

FIG. 5 is a front view of the take-up drum 2, and the guide part of a deformable member guide part is made up with engagement pins 14, a curved path 2j, slopes 2t, and so forth.

Figure 6:
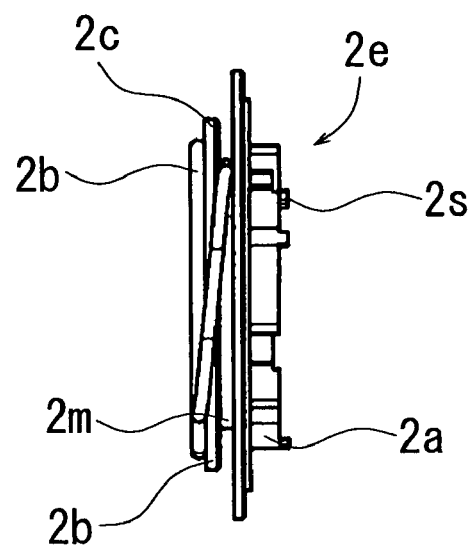
FIG. 6 is a side view of the plate assembly.
Figure 7:
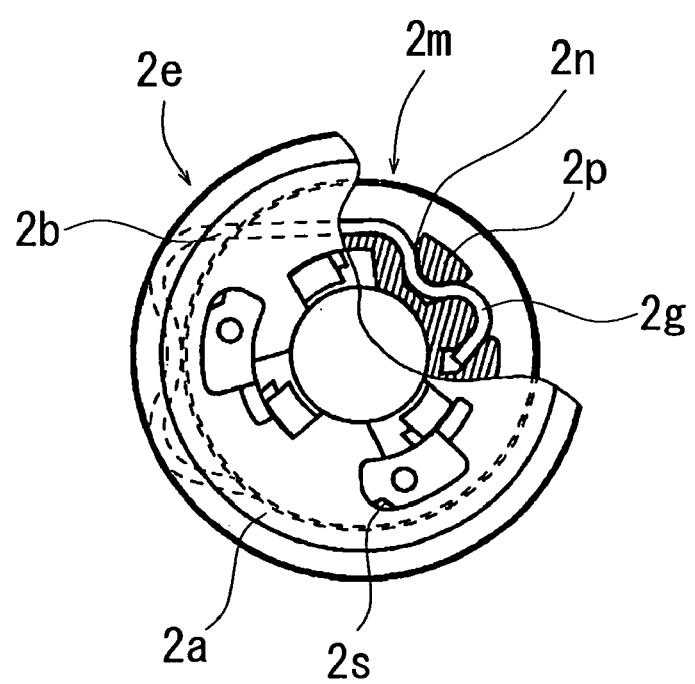
FIG. 7 is a front view partly in section of the plate assembly.

FIG. 6 is a side view of the plate assembly 2e, and FIG. 7 is a front view partly in section of the same, wherein the plate assembly 2e is assembled with the plate body 2a, the wire 2b, and the disk member 2c, as illustrated in FIG. 3.

In FIG. 4, a substantially circular receiving recess 2f which constitutes a part of the second energy-absorbing means is formed on the side where the locking base is mounted on the take-up drum 2, namely, on the end face of the left side in the drawing. Further, an engagement hole 2k which receives a boss 5c (FIG. 2) of the locking base is formed on the center of the receiving recess 2f. The engagement pins 14 to be engaged with the wire 2b are formed at specified places on the periphery of the receiving recess 2f positioned outside the engagement hole 2k on the bottom face. And, the slopes 2t (FIG. 5) are formed at the specified places for engaging with the wire 2b. In this case, three semi-circular engagement pins 14 are formed integrally to project from the bottom face of the receiving recess 2f along the circumference thereof, wherein the wire 2b is formed in spiral, and the circumference 2i thereof is formed in curvature, which conforms to the circular sliding face of the engagement pins 14.

FIG. 6 is a side view of the plate assembly 2e in which the individual components illustrated in FIG. 3 are assembled. As illustrated in the drawing, the disk member 2c and the plate body 2a are engaged integrally with each other in a state where the spiral wire 2b is interposed between both. The plate body 2a and the disk member 2c form a take-up part 2m with a distance approximately equivalent to the diameter of the wire 2b, and the disk member 2c is coupled with the plate body 2a in a manner that a relative rotation between both is impossible. Here, the curved one end 2g of the wire 2b is placed and fixed in a curved groove 2n (FIG. 7) of the plate body 2a.

Thus, the wire 2b having the one end thereof fixed to the plate body 2a passes through the gap between the plate body 2a and the disk member 2c, and when the take-up drum 2 and the plate assembly 2e perform a relative rotation, the wire 2b reaches the upper face of the plate body 2a being the take-up part 2m.

The disk member 2c covers take-up part 2m of the plate body 2a and the one end 2g of the wire 2b in the state where the plate assembly 2e is assembled.

FIG. 7 is a front view which shows the internal structure of the plate assembly 2e, part of which is sectioned. As illustrated in the drawing, the curved groove 2n is formed on the take-up part 2m of the plate body 2a by means of substantially semi-circular plural projections 2p, and the one end 2g of the wire 2b is placed in the curved groove 2n and is coupled therewith. The curvature radius of the curved groove 2n is formed smaller than that of the curved path 2j (FIG. 4) of the take-up drum 2.

Figure 8:
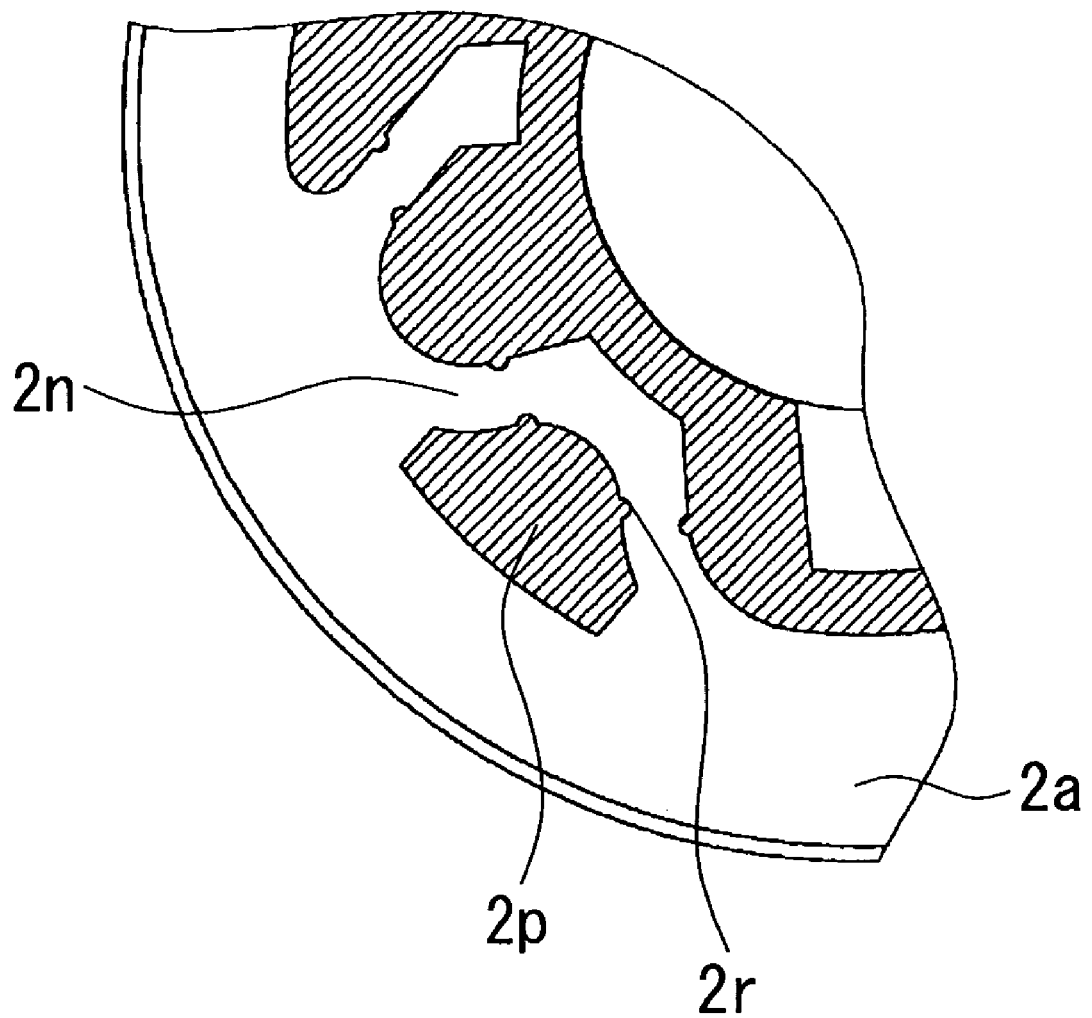
FIG. 8 is a partly enlarged front view in section illustrating another embodiment of the plate assembly.

FIG. 8 illustrates another embodiment of the curved groove 2n. In the plural projections 2p of the plate body 2a, at least one set of ribs 2r facing to each other are formed between the projections 2p forming the curved groove 2n, and the gap between the ribs 2r is made narrower than the diameter of the wire 2b.

Figure 9:
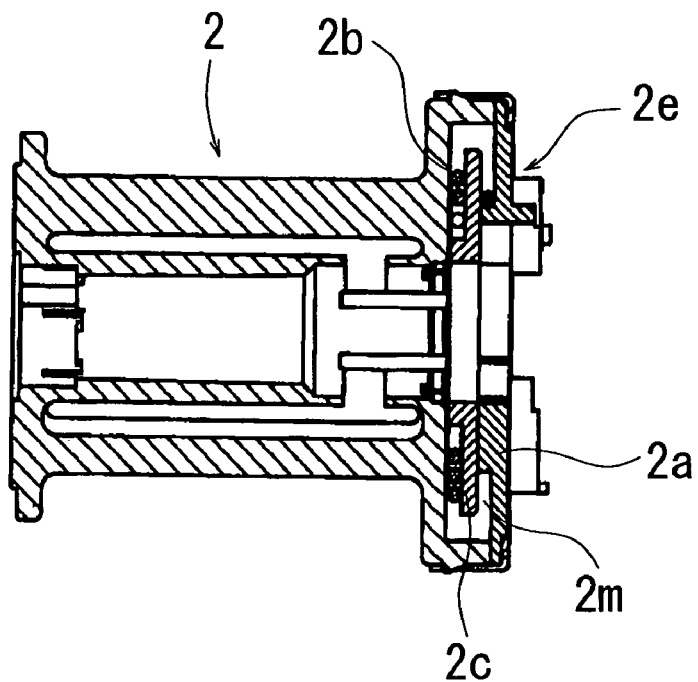
FIG. 9 is a front view in section of an assembly in which the plate assembly and the take-up drum illustrated in FIG. 4 are assembled.
Figure 10:
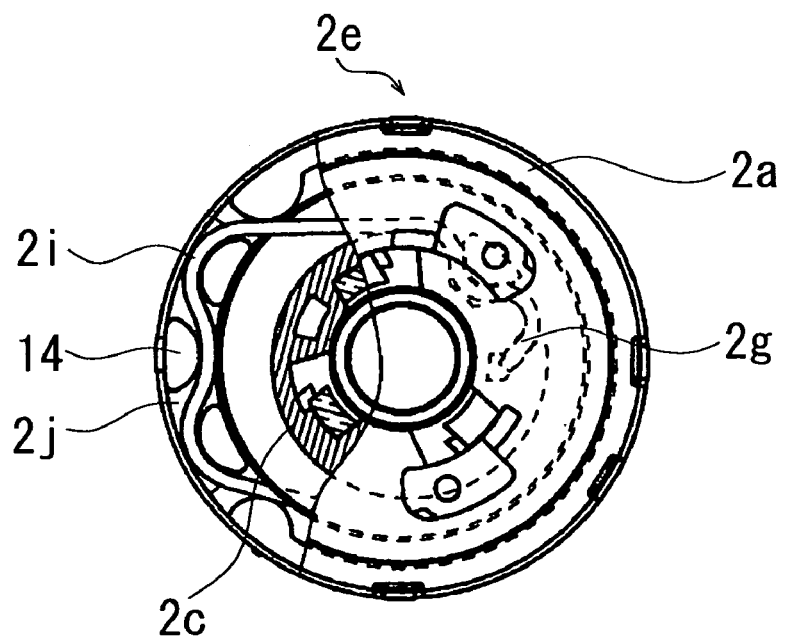
FIG. 10 is a partly cutaway side view of the assembly illustrated in FIG. 9.
Figure 11:
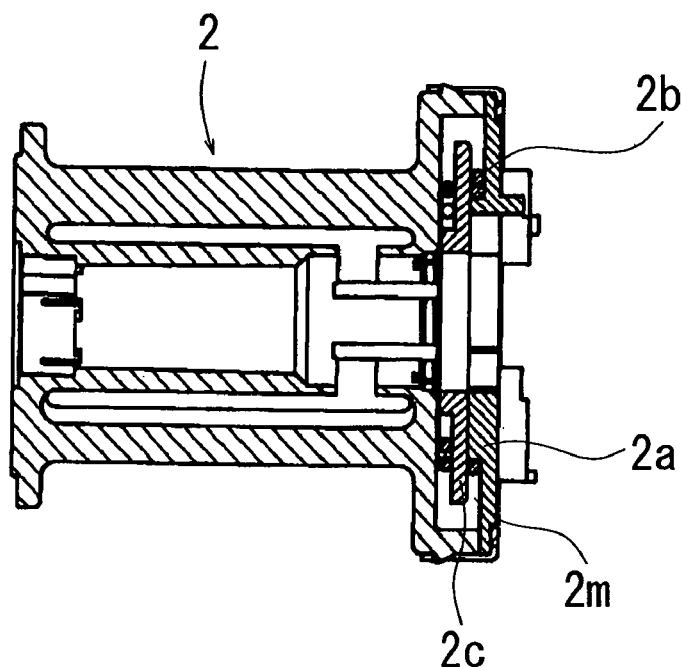
FIG. 11 is a front view in section, in which the assembly illustrated in FIG. 9 is turned.
Figure 12:
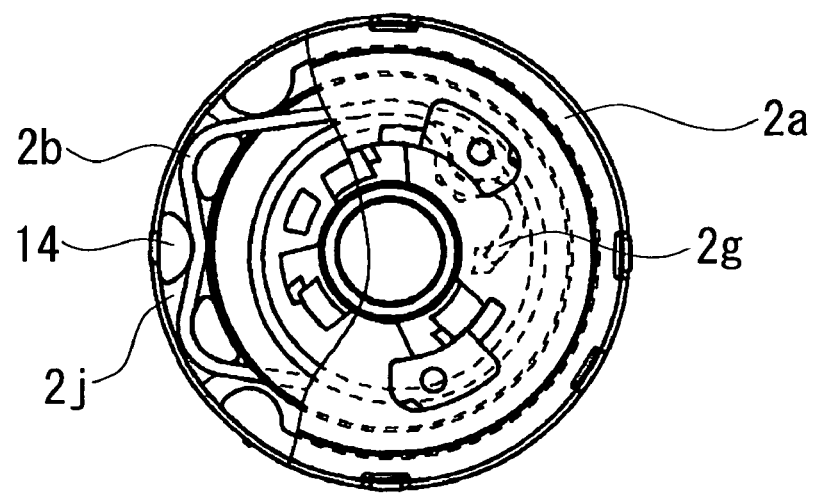
FIG. 12 is a partly cutaway side view of the assembly illustrated in FIG. 11.

FIG. 9 is a front view in section illustrating a state where the take-up drum 2 illustrated in FIG. 4 and the plate assembly 2e are assembled, and FIG. 10 is a partly cutaway side view of the assembly illustrated in FIG. 9. FIG. 11 is a front view in section, illustrating a state where the take-up drum 2 rotates to a certain degree after the emergency lock mechanism actuates the operation in the assembly illustrated in FIG. 9, and FIG. 12 is a partly cutaway side view in the same state.

The second energy-absorbing means having the above construction is contained in a space delimited between the take-up drum 2 and the locking base 5. After the emergency lock mechanism actuates the operation, as the take-up drum 2 rotates, the wire 2b illustrated in FIG. 9 and FIG. 10 is wound into the take-up part 2m, as illustrated in FIG. 11 and FIG. 12.

At this moment, the wire 2b relatively moves between the disk member 2c and the plate body 2a, along the curved circumference 2i projected from the circumferential face of the disk member 2c, while sliding on the three semi-circular engagement pins 14 of the take-up drum 2.

When the emergency lock mechanism actuates the operation, in case of a vehicle emergency such as a collision, the locking base 5 coupled with the other end of the torsion bar 4 is blocked in rotating in the direction of the webbing pulled out. And, when a rotational torque more than a predetermined value acts on the take-up drum 2, due to the load acting on the webbing, the one end of the torsion bar 4 (first energy-absorbing means) actuates a torsional deformation.

Thereby, the take-up drum 2 rotates to a degree corresponding to the torsional deformation in the torsion bar 4, and at the same time, the other end of the torsion bar 4, which is fixed, rotates in the direction of the webbing pulled out, whereby the impact energy is absorbed. And, the actuation of the torsional deformation in the torsion bar 4 generates a relative rotation between the take-up drum 2 and the locking base 5. The absorption of the impact energy by the second energy-absorbing means actuates based on this relative rotation.

While the take-up drum 2 rotates relative to the locking base 5, the plate body 2a to which the one end 2g of the wire 2b is fixed is coupled with the locking base 5, and it does not rotate, while since the engagement pins 14 formed integrally with the take-up drum 2 turn, the wire 2b is pulled between the engagement pins 14. That is, the wire 2b slides between the engagement pins 14 while being positioned by the slopes 2t, while being sequentially pulled to meander between the engagement pins 14. At this moment, there generate a high sliding resistance and a bending resistance in the wire 2b, and hence the sliding resistance and the bending resistance absorb the impact energy.

That is, when the emergency lock mechanism actuates the operation in case of a vehicle emergency, and the load acting on the take-up drum 2 in the direction of the webbing pulled out is increased more than a predetermined value, both the torsion bar 4 (first energy-absorbing means) and the second energy-absorbing means operate as the energy-absorbing mechanism, and absorb the impact energy in case of a vehicle emergency.

Clutch Mechanism

Next, the clutch mechanism will be described which releases the engagement of the plate body 2a with the locking base 5 of the emergency lock mechanism, and puts the plate body 2a from the state of a relative rotation with the take-up drum 2 being possible into the state of a united rotation with the take-up drum 2 being possible with the locking base 5 detached.

This clutch mechanism switches the first state where a relative rotation of the plate body 2a with the other end of the torsion bar 4 is impossible into the second state where a relative rotation of the plate body 2a with the other end of the torsion bar 4 is possible. It also comprises the clutch release mechanism which actuates the switching at an arbitrary timing after detecting a vehicle collision.

The clutch mechanism comprises, as shown in FIG. 2, a joint plate 5b coupled with the emergency lock mechanism in a manner that a relative rotation is impossible, and three joint pawls 12 being pivoted to be turnable on the opposite side of the take-up drum 2 to the plate body 2a, which are in face contact with the joint plate 5b to turn outward.

Figure 16:
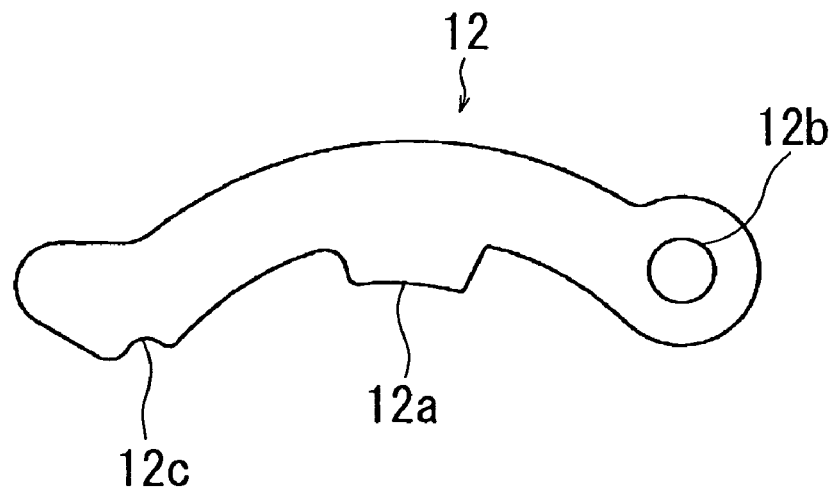
FIG. 16 is an enlarged perspective view of a joint pawl.
Figure 17:
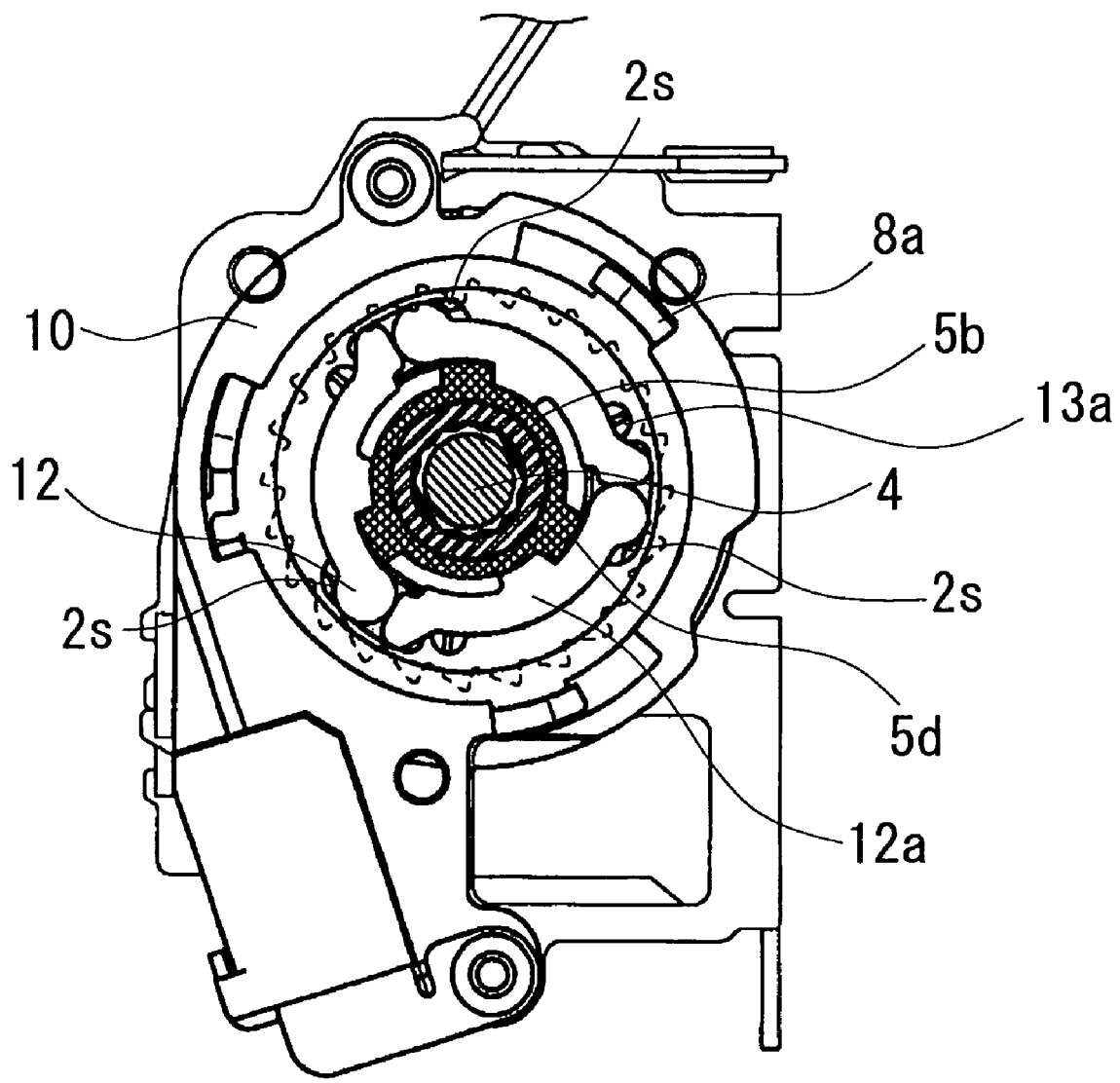
FIG. 17 is a partly cutaway side view of a clutch mechanism before actuating the operation.
Figure 18:
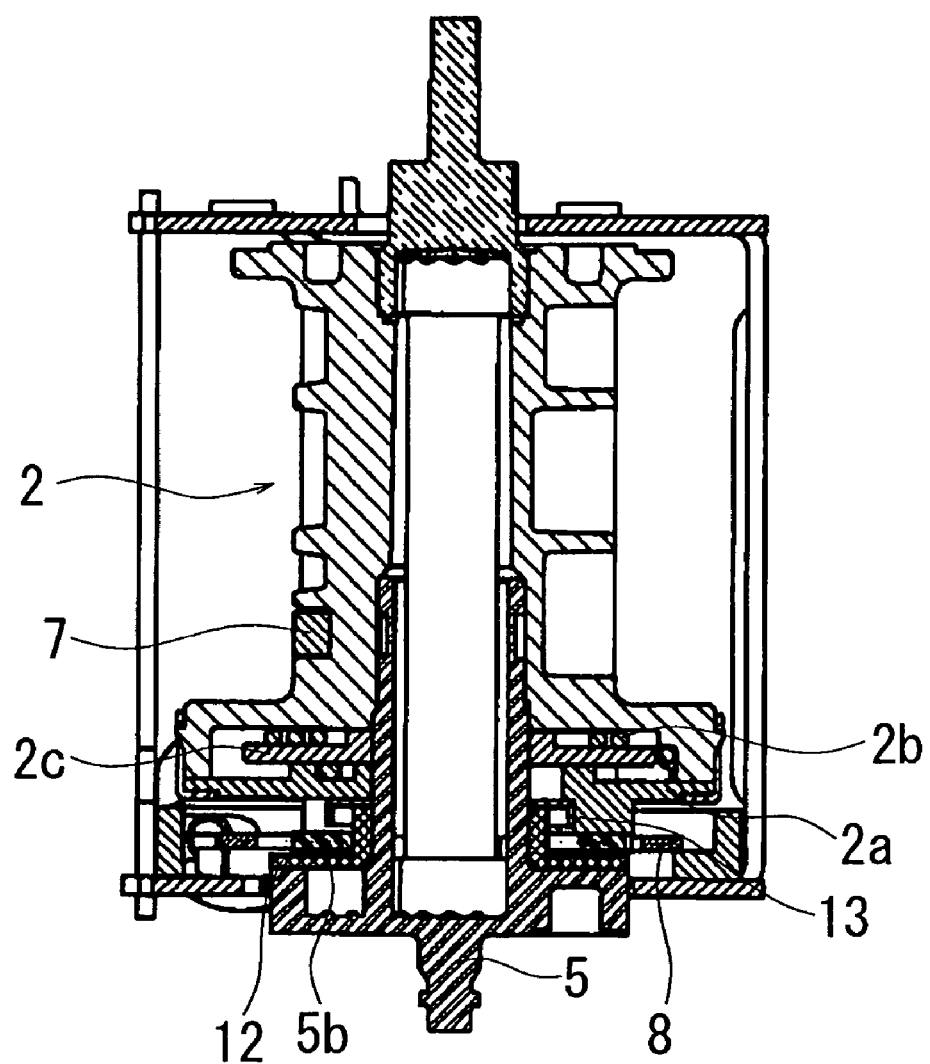
FIG. 18 is a plan view in section of the clutch mechanism illustrated in FIG. 17.
Figure 19:
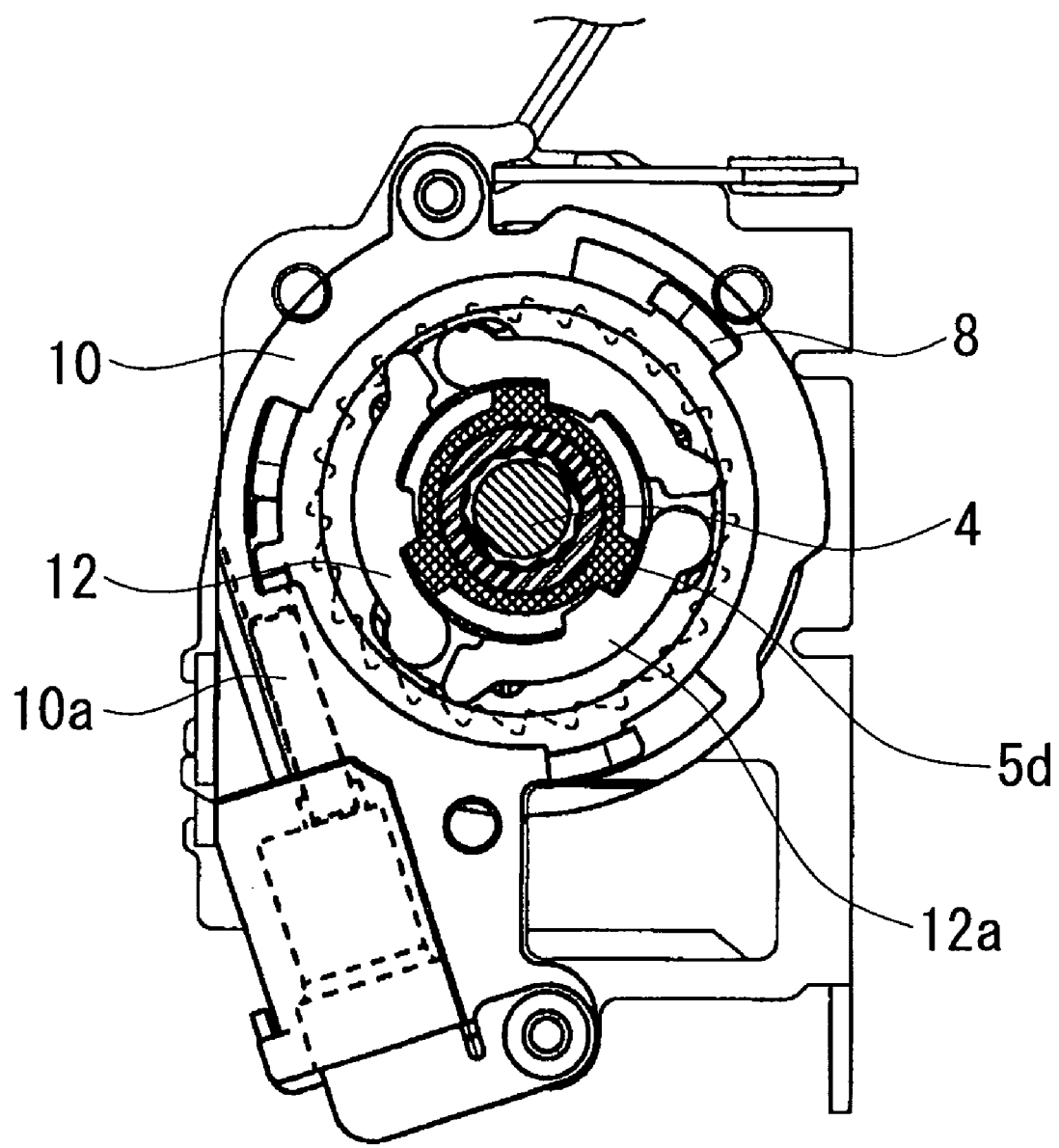
FIG. 19 is a partly cutaway side view explaining a state where the clutch mechanism is engaged (first state)
Figure 20:
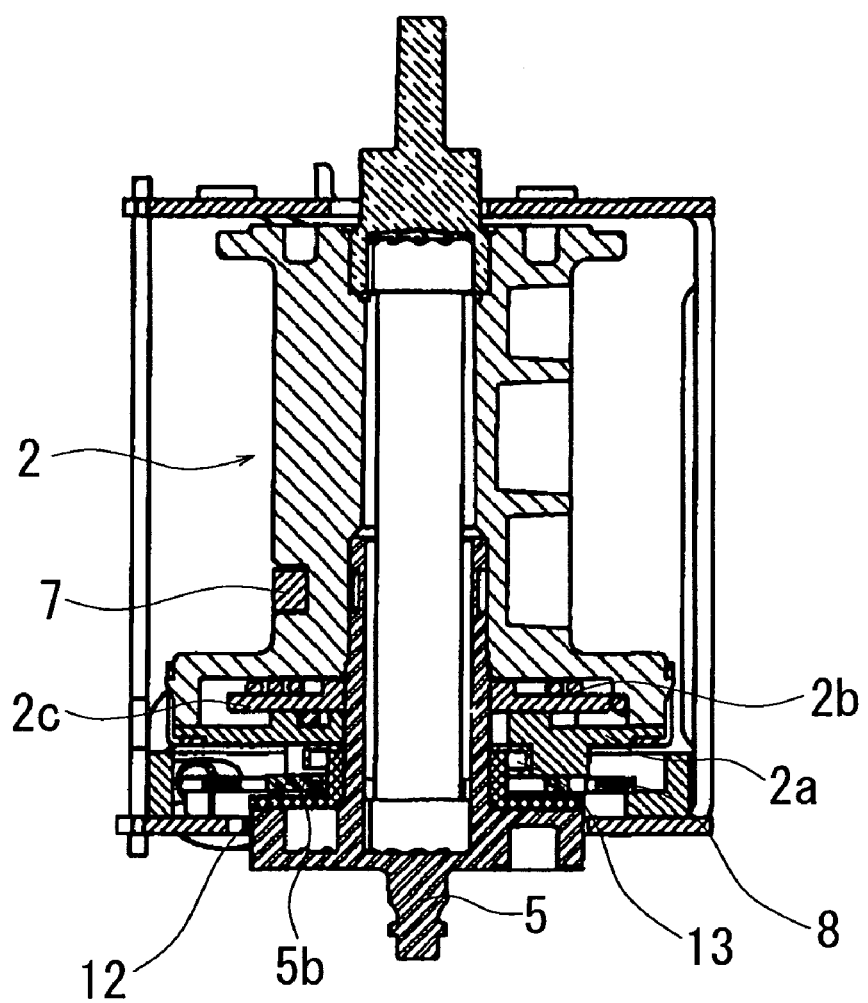
FIG. 20 is a plan view in section of the clutch mechanism illustrated in FIG. 19.

The joint pawl 12 is a bow-formed member, and a pin 12b, which is pivoted on the opposite side of the take-up drum 2 to the plate body 2a, is formed on the one end thereof, and the joint pawl 12 turns with the pin 12b as the center. Further, the joint pawl 12 has an inner projection 12a (FIG. 16) formed on the center of the inner wall.

A pawl holder 13 (resin spring) in a sectional concave and circular form is provided in order to position and support the joint pawls 12. The pawl holder 13 is provided, on the circumference thereof in correspondence with the positions of the joint pawls 12, with nail-formed parts 13c each having ribs 13a formed thereon. Inwardly slant slopes 13b formed on the ribs 13a and the nail-formed parts 13c come into contact with the outer faces of the joint pawls 12. This contact and the resin spring functions to bias the joint pawls 12 continuously toward the axial center.

Meanwhile, as the joint pawls 12 turn outward against the elasticity of the resin spring and climb over the ribs 13a of the pawl holder 13, the pawl holder 13 is released from being pressed, the nail-formed parts 13c return to the insides of the joint pawls 12, and rib backsides 13d of the pawl holder 13 come into contact with notches 12c of the joint pawls 12. On the other hand, since the plate body 2a is provided with projections 2s which restrain the joint pawls 12 from turning relative to the plate body 2a immediately after the joint pawls 12 climb over the ribs 13a of the pawl holder 13, the joint pawls 12 are clamped by the rib backsides 13d of the pawl holder and the projections 2s of the plate body so that the joint pawls 12 are prevented from turning to the plate body 2a.

Therefore, after the clutch is detached once, the clutch will not operate again.

Clutch Release Mechanism

Figure 13:
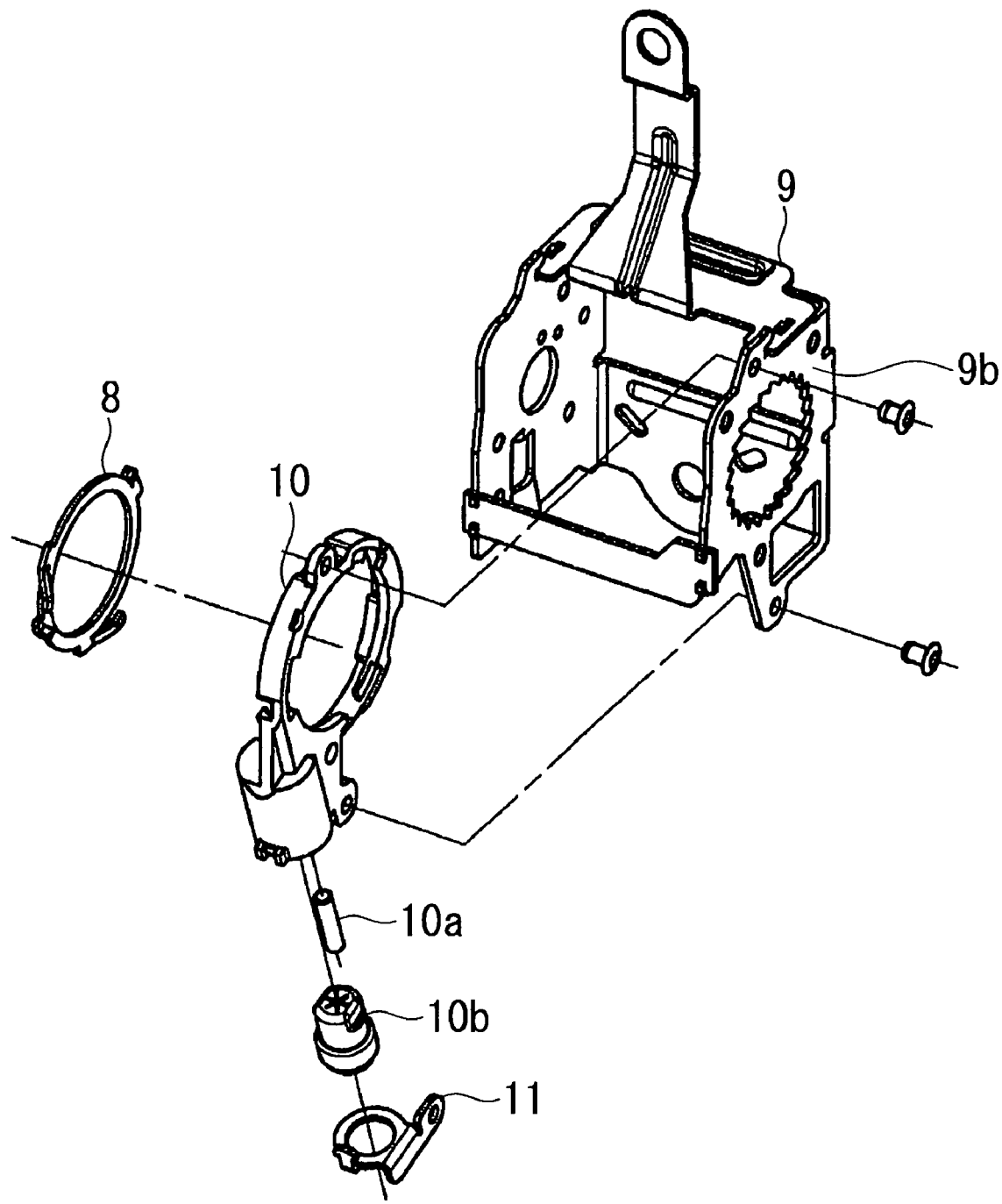
FIG. 13 is an exploded perspective view explaining the assembling of a release ring, a housing, a casing, and so forth, which are illustrated in FIG. 2.
Figure 14:
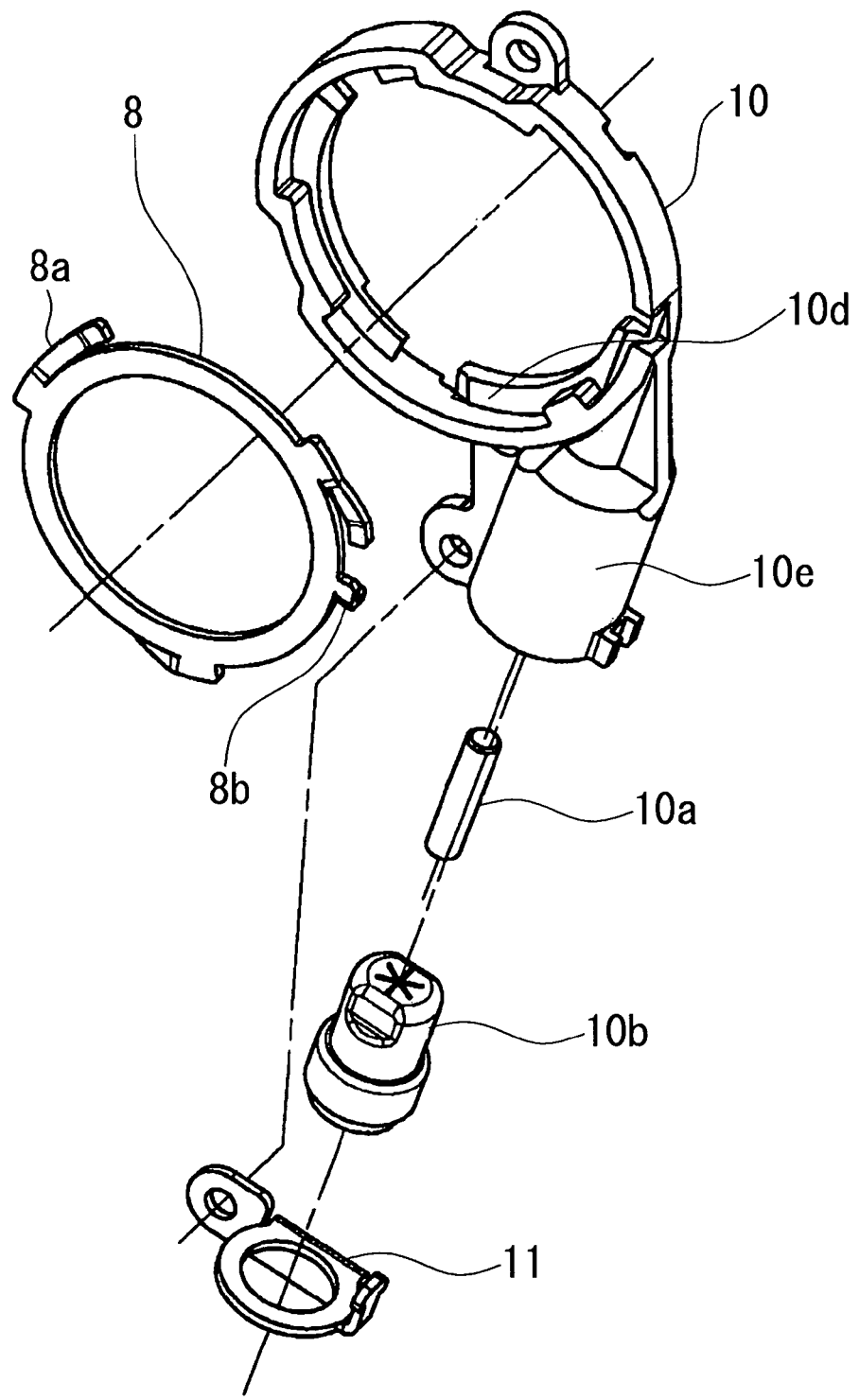
FIG. 14 is an exploded perspective view of the release ring, the casing, a piston, a gas generator, a gas generator holder, and so forth.

FIG. 13 is an exploded-perspective view explaining the assembling of a release ring 8, the housing 9, a casing 10, and so forth being the components for releasing the clutch. FIG. 14 is an enlarged exploded perspective view of the release ring 8, the casing 10, a piston 10a, a gas generator 10b, a gas generator holder 11, and so forth, which are illustrated in FIG. 13.

The clutch release mechanism will be described with reference to FIG. 13 and FIG. 14. The release ring 8 is mounted to be rotatable on the casing 10 fixed to the side plate 9b of the housing on the other side of the torsion bar 4 (FIG. 2), which is located on the circumferences of the joint pawls 12.

As illustrated in FIG. 13 and FIG. 14, the clutch release mechanism is made up with the casing 10, the gas generator 10b which generates gas in a cylinder 10e at an arbitrary timing after detecting a vehicle collision, and the piston 10a, which is pressed and driven by the gas pressure in the cylinder, and presses the circumference of the release ring 8 to rotate the release ring 8. The gas generator 10b is attached to the casing 10 by the gas generator holder 11.

The release ring 8 is provided with a contact 8b which comes in contact with the piston 10a, and three tapered parts 8a located with a uniform spacing on the circumference thereof. On the other hand, the casing 10 which holds the release ring 8 is provided with tapered projections 10d corresponding to the tapered parts 8a of the release ring 8 rotated.

In the operation, the piston 10a pressed and driven by the gas pressure comes in contact with the contact 8b formed on the circumference of the release ring 8, and hence the release ring 8 rotates. Thereby, the tapered parts 8a of the release ring 8 are guided by the tapered projections 10d of the casing, and the release ring 8 retreats toward the take-up drum 2 (FIG. 1) and retreats from the circumferences of the joint pawls 12 (FIG. 2).

Next, the operation of the clutch mechanism will be described based on FIG. 17 through FIG. 22.

FIG. 17 through FIG. 22 are partly cutaway side views and plan views in section, which explain the operation of the clutch mechanism.

In FIG. 17 through FIG. 22, as already described, the clutch mechanism switches the first state where a relative rotation of the plate body 2a with the other end of the torsion bar 4 is impossible into the second state where a relative rotation of the plate body 2a with the other end of the torsion bar 4 is possible.

Figure 15:
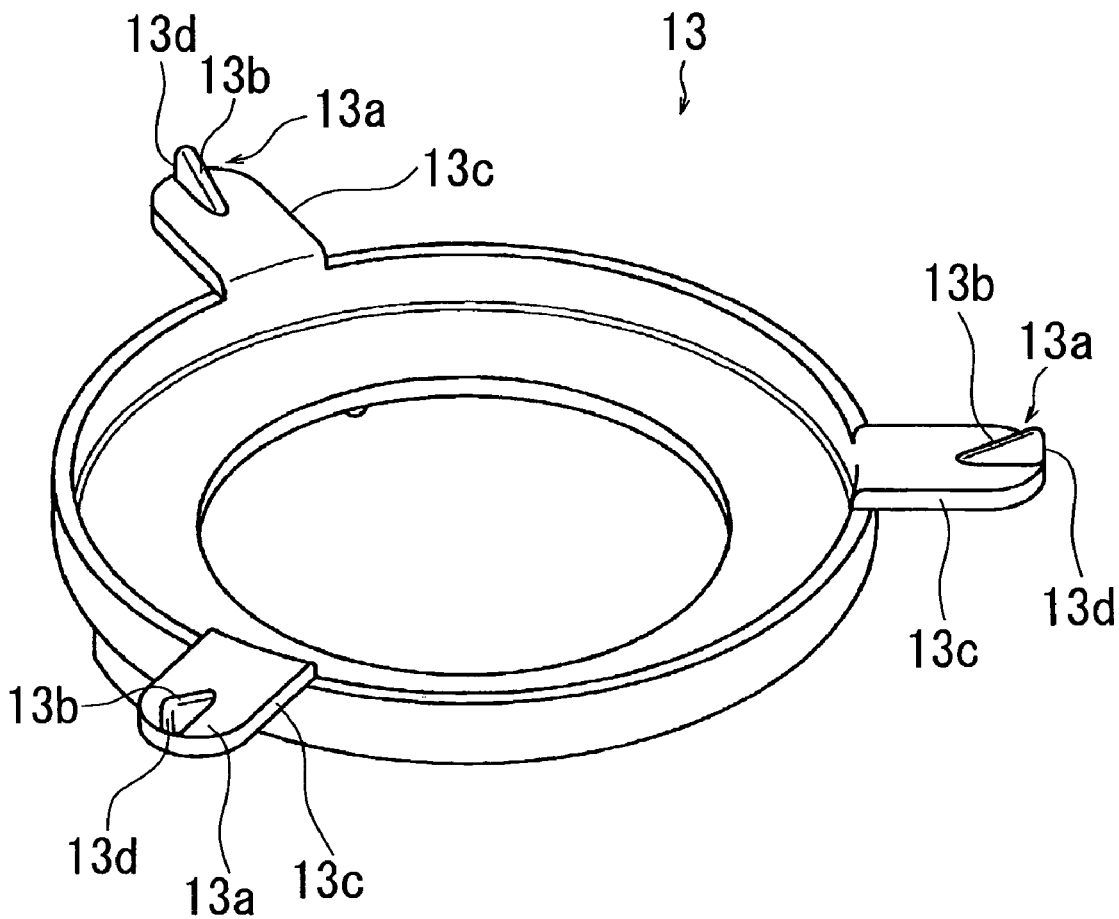
FIG. 15 is an enlarged perspective view of a pawl holder.

In the assembly state, the joint pawls 12 are biased toward the axial center by the slopes 13b (FIG. 15) formed on the ribs 13a of the pawl holder 13. The three joint pawls 12 are fixed at the most inwardly convergent position, in non-contact with the inner circumference of the release ring 8, and the inner projections 12a of the joint pawls 12 are in contact with projections 5d of the joint plate 5b.

Here, as the emergency lock mechanism actuates the operation, an engagement tooth 6b of a lock pawl 6 (FIG. 24) engages with the lock teeth 9a (FIG. 2) formed on the side plate 9b of the housing, thus generating a relative rotation between the joint plate 5b and the plate body 2a which will continue to rotate. At this moment, a relative rotation is generated between the joint pawls 12 and the projections 5d of the joint plate, whereby the projections 5d of the joint plate press the inner projections 12a of the joint pawls 12, so that the joint pawls 12 receive a force toward the circumference, and they are prone to expand outwardly.

When the force exceeds the biasing force of the pawl holder 13, the joint pawls 12 come in contact with the inner-circumferential wall of the release ring 8. When the joint pawls 12 come in contact with the inner-circumferential wall of the release ring 8 and the outward expansion thereof is restrained, the locking base 5 and the plate body 2a become integrated with each other, and a relative rotation is generated between the take-up drum 2 and the plate body 2a, so that the wire 2b is pulled and the second energy absorption is performed, in addition to the energy absorption by the torsion bar 4.

Next, as the clutch release mechanism actuates the operation in this state, the piston 10a (FIG. 14) operates to rotate the release ring 8, whereby the rotation of the release ring 8 guides the tapered parts 8a of the release ring 8 to the tapered projections 10d of the casing (FIG. 14). Thus, the release ring 8 retreats toward the take-up drum 2, and retreats from the circumferences of the joint pawls 12 at the same time.

The joint pawls 12 come in face contact with the joint plate 5b to expand outwardly, and become detached from the projections 5d of the joint plate, whereby the plate body 2a is released from the locking base 5.

Figure 21:
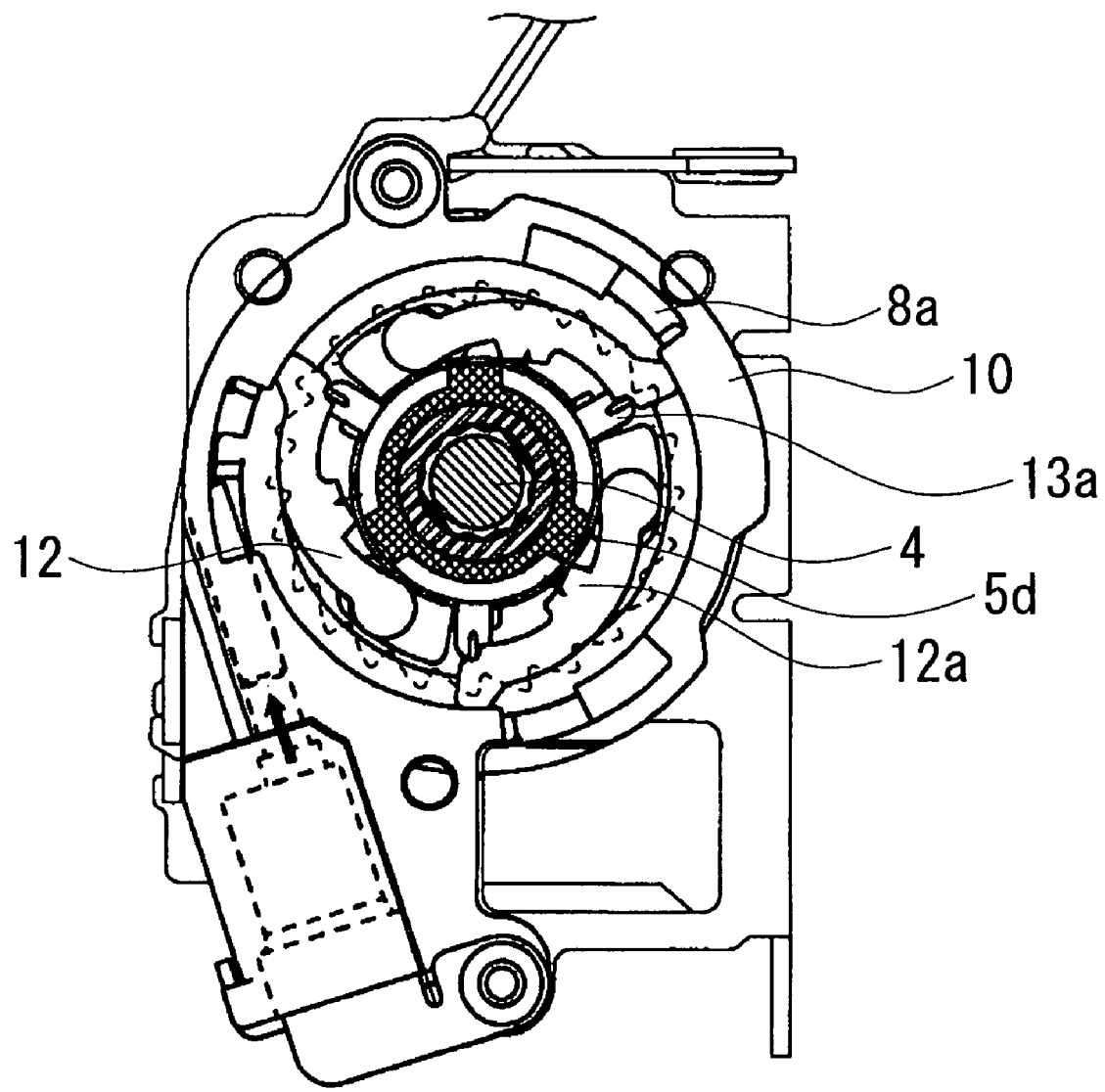
FIG. 21 is a partly cutaway side view explaining a state where the clutch mechanism is released (second state)
Figure 22:
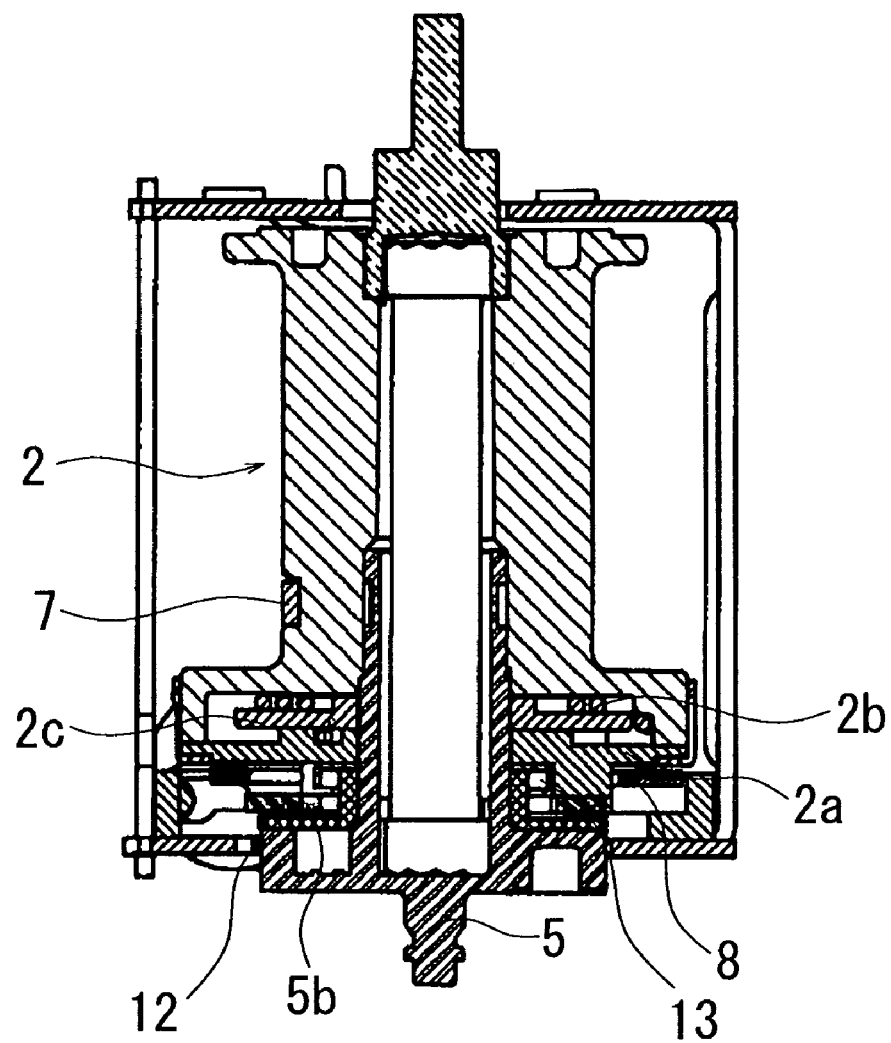
FIG. 22 is a plan view in section of the clutch mechanism illustrated in FIG. 21.

That is, as the clutch mechanism actuates the operation to move the release ring 8 in the axial direction, as illustrated in FIG. 21 and FIG. 22, the joint pawls 12 expand outward, and the projections 5d of the joint plate are completely detached from the joint pawls 12, and hence the locked state where the locking base 5 and the plate body 2a are integrally fixed is released. In consequence, the pull-out motion of the wire 2b is halted, and the plate body 2a and the take-up drum 2 become rotatable integrally. However, since the take-up drum 2 and the locking base 5 continue a relative rotation even in this case, the torsion bar 4 alone continues the energy absorption.

Emergency Lock Mechanism

Figure 23:
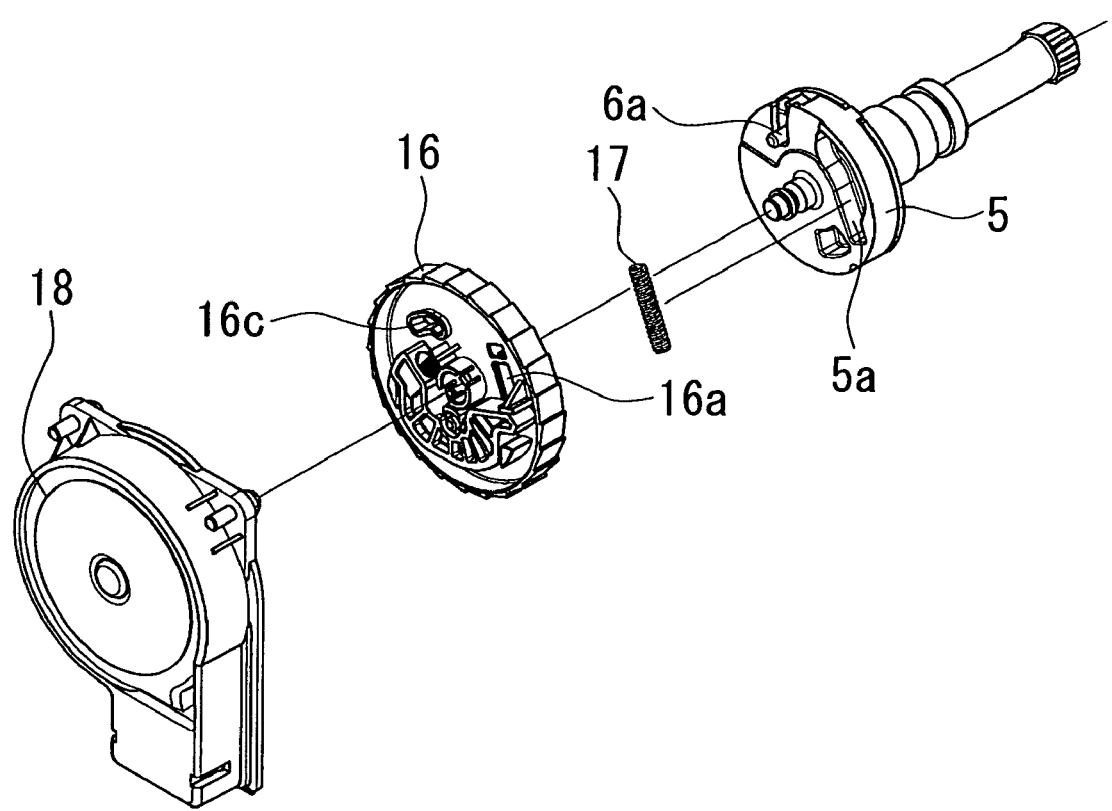
FIG. 23 is an exploded perspective view explaining the assembling of the locking base, a lock clutch, a cover, and so forth.
Figure 24:
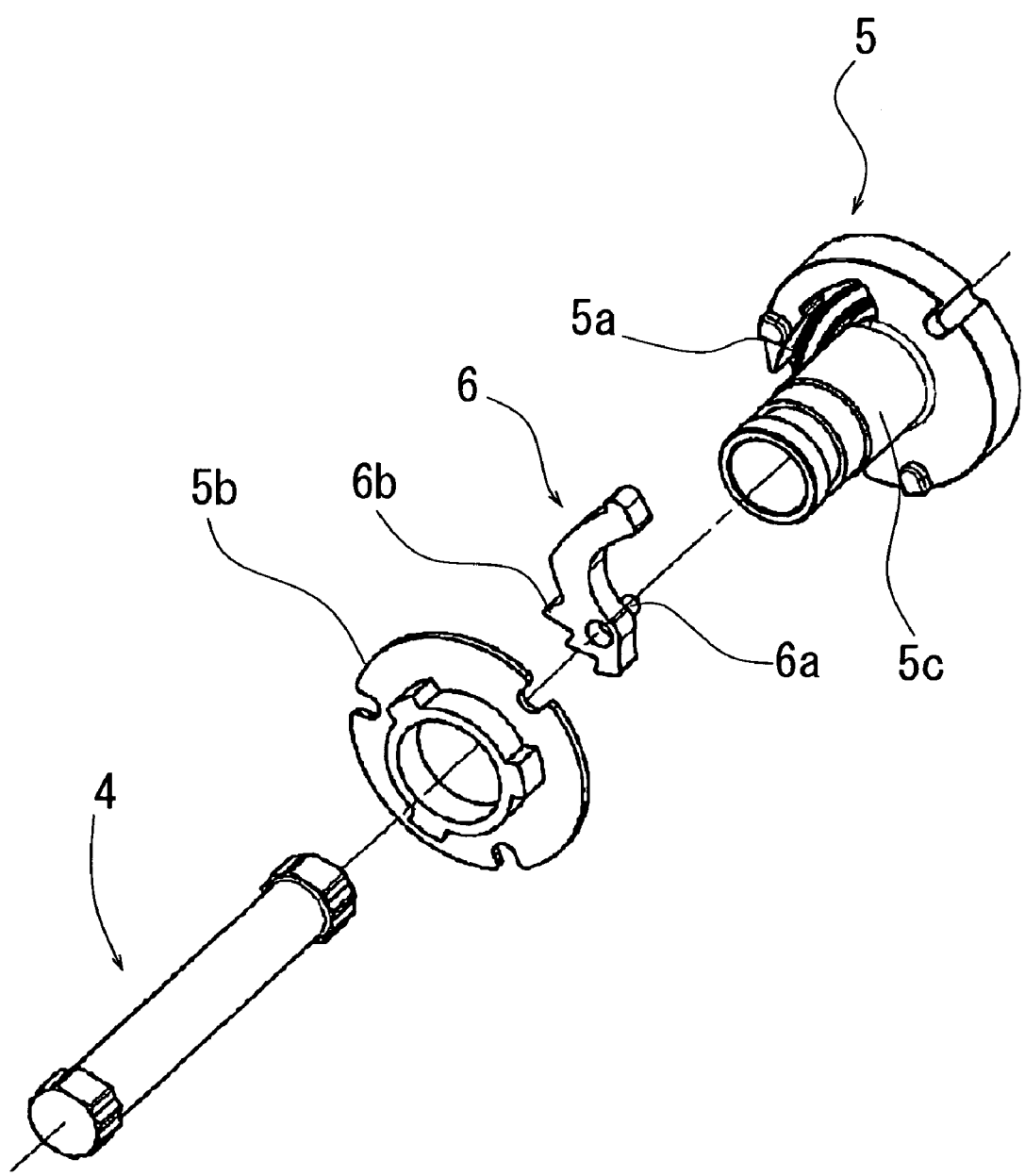
FIG. 24 is an exploded perspective view explaining the assembling of the torsion bar, the locking base, and so forth which are illustrated in FIG. 2.

FIG. 23 is an exploded perspective view explaining the assembling of the emergency lock mechanism, which is made up with the locking base 5, a lock clutch 16, a cover 18, and so forth. FIG. 24 is an exploded perspective view explaining the assembling of the torsion bar 4, the lock pawl 6, the locking base 5, and so forth.

As a concrete construction of the emergency lock mechanism, various known ones may be adopted. As one example, as illustrated in FIG. 23 and FIG. 24, a spring receiving part 16a is formed to project on one side of the lock clutch 16, and the spring receiving part 16a is engaged to be relatively movable with a play inside a spring containing part 5a resembling a recessed-groove shape, which is formed on the locking base 5.

At this moment, the spring receiving part 16a is elastically biased in a specified direction by a return spring 17 made of a coil spring retained in the spring containing part 5a, and the lock clutch 16 is made to rotate synchronously with the locking base 5 in a state of being biased in the direction of the webbing pulled out.

The torsion bar 4 is inserted in a hole bored through the cylindrical boss 5c, which is formed to project from the side of the locking base 5 in the direction of facing the take-up drum 2, whereby the torsion bar 4 is coupled with the locking base 5 to be rotatable integrally.

The lock clutch 16 has a projected guide groove 16c formed thereon, and into the guide groove 16c, an interlocking pin 6a formed on the lock pawl 6 (FIG. 24) is slid and guided. The interlocking pin 6a is made to be slid and guided into the projected guide groove 16c by a relative rotation of the lock clutch 16 and the locking base 5 against the biasing force by the return spring 17. This sliding and guiding of the interlocking pin 6a makes it possible to freely project or retreat the engagement tooth 6b of the lock pawl 6 from the circumference of the locking base 5.

The emergency lock mechanism is made up with the locking base 5, the lock pawl 6, the lock teeth 9a (FIG. 2) formed on the housing 9, the lock clutch 16, and so forth.

In order to actuate the emergency lock mechanism, a cover 18 is provided with a lock actuating mechanism which actuates the emergency lock mechanism in response to an abrupt pull-out of the webbing and an abrupt variation in the acceleration.

The locking base 5 and the lock pawl 6 are attached with the joint plate 5b.

The engagement tooth 6b is formed on a tip of the lock pawl 6, and the lock pawl 6 is located to be slidable on the locking base 5 by the interlocking pin 6a. The lock teeth 9a with which the engagement tooth 6b of the lock pawl 6 is able to engage are formed on the side plate 9b of the housing 9, and in case of a vehicle emergency, the engagement tooth 6b of the lock pawl 6 is engaged with the lock teeth 9a, and this engagement restrains the locking base 5 from rotating in the direction of the webbing pulled out.

According to the invention thus described, since the second energy-absorbing means is contained in a space delimited by the take-up drum 2 and the locking base 5, there is not a substantial size expansion in the axial direction of the seatbelt retractor to sacrifice the compactification, although the second energy-absorbing means is provided separately from the torsion bar 4.

Further, the structures of the wire 2b and the engagement pins 14 which constitute the second energy-absorbing means are equally simple, and the manufacturing process thereof is rather simple as well.

Figure 25:
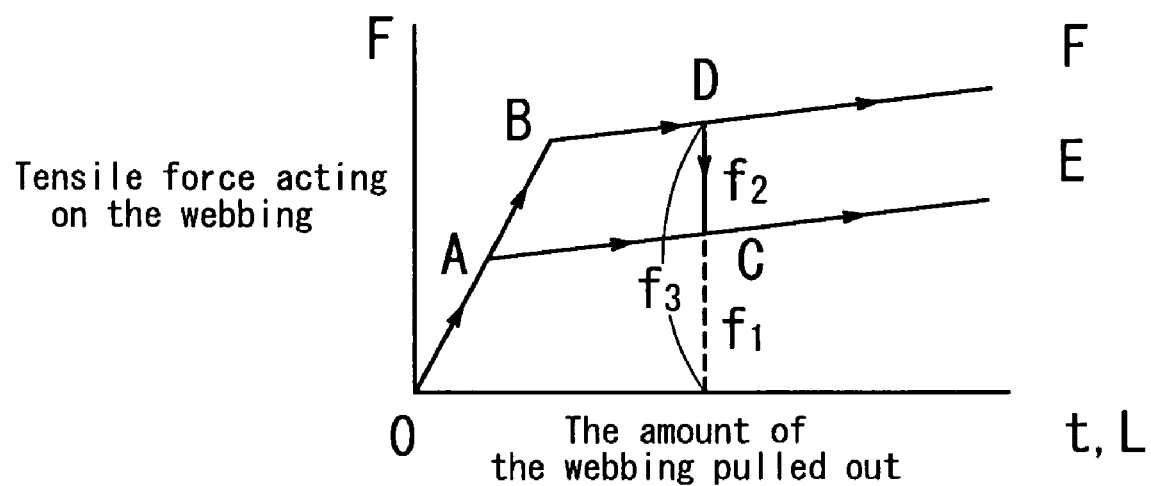
FIG. 25 is a diagram illustrating the relation between a tensile force acting on the webbing and the amount of the webbing pulled out.

FIG. 25 is a diagram illustrating the relation between a tensile force acting on the webbing and the amount of the webbing pulled out.

The whole energy-absorbing load of the seatbelt retractor is the sum f3 of an energy-absorbing load f1 when the torsion bar 4 generates a torsional deformation and an energy-absorbing load f2 by the second energy-absorbing means, as illustrated in FIG. 25.

In case of a high energy-absorbing load, the relation between both forms a curve O, A, B, D, F in case of a low energy-absorbing load, it forms a curve O, A, C, E by the switching by the clutch mechanism, and, in case of a medium energy-absorbing load, it forms a curve O, A, B, D, C, E.

Further, with regard to the area of the energy absorption by the torsional deformation in the torsion bar 4, the area of the energy absorption by the sliding resistance of the second energy-absorbing means can be set freely independently.

For example, the area of the energy absorption by the second energy-absorbing means can be set to overlap a part of the area of the energy absorption by the torsional deformation in the torsion bar 4, thereby securing a high energy-absorbing load equivalent to the sum of both the energy-absorbing loads, in the part of the area of the energy absorption by the torsional deformation in the torsion bar 4. In the area where both the energy-absorbing areas do not overlap each other, a low energy-absorbing load can be set only by the energy-absorbing function by the torsional deformation in the torsion bar 4. Thus, it is possible to provide the energy-absorbing mechanism of the seatbelt retractor with such an energy-absorbing characteristic in which the energy-absorbing load varies during the operation.

Further, the adjustment of the whole energy-absorbing load of the seatbelt retractor is related to various factors such that it is related not only to the modifications of the diameter and material of the torsion bar 4, but also to the modifications of the size, shape, and material of the second energy-absorbing means. For example, it is possible to realize a desired energy-absorbing load, not depending on the modifications such as expansion of the diameter of the torsion bar 4 and modification of the material thereof, but by means of the design modification of the other remaining factors. That is, it is possible to easily set the energy-absorbing load high, without sacrificing the compactification of the seatbelt retractor by reducing the diameters of the torsion bar 4 and the take-up drum 2. And, in case that the size and the material of both the torsion bar 4 and the second energy-absorbing means can be modified, by adjusting the energy-absorbing load and adjusting the energy-absorbing area in both the means, it becomes possible to easily meet the demand for a specific energy characteristic based on differences of the vehicle structure, and also possible to flexibly meet various needs.

Meanwhile, it is preferable to set the adjustment of the sliding resistance between the wire 2b and the engagement pins 14 based on various factors such as a shape of the curved path, roughness of the contact faces of both, and size of the contact area and so forth. When the adjustment of the sliding resistance is set based on various factors in this manner, for example, if a modification of part of the factors becomes difficult due to the restrictions of the dimensions, modifying the other factors will make it possible to adjust the sliding resistance comparably easily to an arbitrary value required.

As described above, according to the seatbelt retractor of the present invention, the lock actuating device actuates the emergency lock mechanism in case of a vehicle emergency, which restrains the other end of the torsion bar 4 from rotating in the direction of the webbing pulled out, and restrains the take-up drum 2 from rotating. At this moment, as the webbing is pulled out by a pull-out force more than a predetermined value, the one end of the torsion bar 4 is coupled with the take-up drum 2 being driven to rotate in a manner that a relative rotation is impossible, and the other end thereof is coupled with the emergency lock mechanism which has restrained the rotation in a manner that a relative rotation is impossible, and hence the torsion bar 4 generates a torsional deformation, thereby rotating the take-up drum 2. At the same time, there generates a relative rotation between the take-up drum 2 being rotating and the plate body 2a on the other end of the torsion bar 4 with the rotation restrained. And, while the take-up drum 2 being rotating deforms the wire 2b, the one end of which is coupled with the take-up part 2m of the plate body 2a with the rotation restrained, at any time in the curved path 2j, the take-up drum 2 winds up the wire 2b into the take-up part 2m of the plate body 2a. At this moment, the wound-up wire 2b is positioned on an upper part in the circumferential direction of the take-up part 2m by a wire guide formed on a periphery of the take-up drum 2.

Since the wire guide is formed on the curved path 2j, the wire 2b is positioned while being deformed, on the upper part in the circumferential direction of the take-up part 2m.

The disk member 2c and the plate body 2a are in parallel with each other along the circumferential direction of the take-up part 2m, and the wire 2b is wound up doubly trebly on the upper part in the circumferential direction of the take-up part 2m by the take-up drum 2, while being guided by both the members. Further, the disk member 2c prevents the wire 2b before deformation (side of the other end) and the wire 2b after deformation (side of the one end) from interfering each other.

Since the curvature radius of the curved groove 2n on the take-up part 2m is smaller than that of the curved path 2j on the take-up drum 2, when the take-up drum 2 and the plate body 2a rotate relatively with each other, the wire 2b is pulled out from the curved path 2j on the take-up drum 2.

Since at least one set of the ribs 2r are formed in the curved groove 2n formed by the plural projections 2p, and the gap between the ribs 2r is narrower than the diameter of the wire 2b, the wire 2b placed in the curved groove is firmly coupled therewith.

On the way of the energy absorption by the torsion bar 4 and the wire 2b, since the clutch mechanism puts the plate body 2a into a state of a relative rotation being possible with the other end of the torsion bar 4, it is possible to discontinue the deformation of the wire 2b at an arbitrary timing.

INDUSTRIAL APPLICABILITY

The present invention is useful for a seatbelt retractor which absorbs an impact load acting on a vehicle occupant in case of a vehicle emergency such as a collision, and secures the vehicle occupant.

The invention claimed is:

1. A seatbelt retractor comprising:
a take-up drum on which a webbing is wound;
a torsion bar inserted through the take-up drum and biased in the direction of the webbing being taken up, wherein one end of the torsion bar is coupled with one end of the take-up drum in a manner that a relative rotation with the take-up drum is impossible;
an emergency lock mechanism located on the other end of the torsion bar, which restrains a rotation in the direction of the webbing being pulled out;
a lock actuating device which actuates the emergency lock mechanism in case of a vehicle emergency;
a plate body having a take-up part on a take-up side of the plate body, wherein the take up side of the plate body is adjacent to a side on an other end of the take-up drum, and wherein the plate body is coupled with the other end of the torsion bar in a manner that a relative rotation with the torsion bar is impossible;
a wire, wherein one end of the wire is coupled with the take-up part of the plate body, wherein a wound part of the wire is not wound up on the take-up part, wherein a middle part of the wire is provided at a position along the wire which is between the one end of the wire and the wound part of the wire, wherein the middle part of the wire is located in a curved path formed on a periphery on the other end of the take-up drum, and wherein the wire is wound up on the take-up part by the take-up drum in case of a vehicle emergency; and
a disk member located between the take-up drum and the plate body and coupled with the plate body at a distance of approximately the diameter of the wire from the plate body in a manner that a relative rotation with the plate body is impossible, and wherein the disk member covers the take-up part of the plate body and the wound part of the wire which is not wound up on the take-up part,
wherein the wound part of the wire which is not wound up on the take-up part is provided in an axial direction of the torsion bar between the disk member and the take-up drum.

2. A seatbelt retractor according to claim 1, wherein the one end of the wire which is coupled with the take-up part of the plate body is located in a curved groove formed by plural projections, and the radius of curvature of the curved groove is smaller than that of the curved path of the take-up drum.

3. A seatbelt retractor according to claim 2, wherein at least one set of ribs face each other and are provided between the plural projections forming the curved groove, and a gap between the at least one set of ribs is narrower than a diameter of a portion of the wire.

4. The seat belt retractor according to claim 1, wherein the torsion bar absorbs energy in an emergency by being twisted.

5. The seat belt retractor according to claim 1, wherein the disk member is provided in an axial direction of the torsion bar between the wound part of the wire which is not wound up on the take-up part and the one end of the wire.

6. The seat belt retractor according to claim 1, wherein the wound part of the wire which is not wound up on the take-up part is wound with more than 1 revolution.

7. The seat belt retractor according to claim 1, wherein the emergency lock mechanism restrains a rotation of the torsion bar in the direction of the webbing being pulled out.

8. The seat belt retractor according to claim 1, wherein the emergency lock mechanism is provided farther away from the one end of the torsion bar than the plate body.

9. The seat belt retractor according to claim 1, wherein the curved path is formed by engagement pins which project from the take-up drum in an axial direction of the torsion bar.

10. A seatbelt retractor comprising:
a take-up drum on which a webbing is wound;
a torsion bar inserted through the take-up drum and biased in the direction of the webbing being taken up, wherein one end of the torsion bar is coupled with one end of the take-up drum in a manner that a relative rotation with the take-up drum is impossible;
an emergency lock mechanism located on the other end of the torsion bar, which restrains a rotation in the direction of the webbing being pulled out;
a lock actuating device which actuates the emergency lock mechanism in case of a vehicle emergency;
a plate body having a take-up part on a take-up side of the plate body, wherein the take-up side of the plate body is adjacent to a side on an other end of the take-up drum, and wherein the plate body is coupled with the other end of the torsion bar in a manner that a relative rotation with the torsion bar is impossible;
a deformable member, wherein one end of the deformable member is coupled with the take-up part of the plate body, wherein a wound part of the deformable member is not wound up on the take-up part, wherein a middle part of the deformable member is provided at a position along the deformable member which is between the one end of the deformable member and the wound part of the deformable member, wherein the middle part of the wire is located in a deformable member guide part formed on a periphery on the other end of the take-up drum, and wherein the deformable member is wound up on the take-up part by the take-up drum in case of a vehicle emergency; and
a disk member located between the take-up drum and the plate body,
wherein the deformable member guide part defines a curved path;
and a clutch mechanism provided between the emergency lock mechanism and the plate body, and
wherein the wound part of the deformable member which is not wound up on the take-up part is provided in an axial direction of the torsion bar between the disk member and the take-up drum.

11. The seat belt retractor according to claim 10, wherein the torsion bar absorbs energy in an emergency by being twisted.

12. The seat belt retractor according to claim 10, wherein the wound part of the wire which is not wound up on the take-up part is wound with more than 1 revolution.

13. The seat belt retractor according to claim 10, wherein the emergency lock mechanism restrains a rotation of the torsion bar in the direction of the webbing being pulled out.

14. The seat belt retractor according to claim 10, wherein the emergency lock mechanism is provided farther away from the one end of the torsion bar than the plate body.

15. The seat belt retractor according to claim 10, wherein the curved path is formed by engagement pins which project from the take-up drum in an axial direction of the torsion bar.

* * * * *